US009774989B2

(12) United States Patent
Osman

(10) Patent No.: US 9,774,989 B2
(45) Date of Patent: Sep. 26, 2017

(54) POSITION AND ROTATION OF A PORTABLE DEVICE RELATIVE TO A TELEVISION SCREEN

(71) Applicant: Sony Interactive Entertainment Inc., Tokyo (JP)

(72) Inventor: Steven Osman, San Francisco, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 933 days.

(21) Appl. No.: 13/627,978

(22) Filed: Sep. 26, 2012

(65) Prior Publication Data

US 2013/0076894 A1 Mar. 28, 2013

Related U.S. Application Data

(60) Provisional application No. 61/539,946, filed on Sep. 27, 2011.

(51) Int. Cl.
*H04W 4/02* (2009.01)
*H04N 21/41* (2011.01)
*H04N 21/45* (2011.01)

(52) U.S. Cl.
CPC .......... *H04W 4/02* (2013.01); *H04N 21/4126* (2013.01); *H04N 21/4524* (2013.01); *H04W 4/023* (2013.01); *H04W 4/028* (2013.01)

(58) Field of Classification Search
None
See application file for complete search history.

(56) References Cited

U.S. PATENT DOCUMENTS

| 2,632,058 A * | 3/1953 | Gray ................. H01J 31/04 235/489 |
| 7,421,111 B2 * | 9/2008 | Dietz ................. G06F 3/03542 382/154 |
| 2004/0043816 A1 * | 3/2004 | Gilton ................. A63H 30/04 463/39 |
| 2005/0099405 A1 * | 5/2005 | Dietz ................. G06F 3/03542 345/179 |
| 2011/0014982 A1 * | 1/2011 | Hiraishi ................. A63F 13/04 463/36 |

* cited by examiner

*Primary Examiner* — William C Vaughn, Jr.
*Assistant Examiner* — Stuart Bennett
(74) *Attorney, Agent, or Firm* — Martine Penilla Group, LLP

(57) ABSTRACT

A method for determining the location of a portable device relative to a display is provided. An image stream is captured by the portable device when the portable device is positioned proximate to the display. The image stream is captured from a region of the display when the display is actively rendering a content stream, the content stream including embedded content for position determination. The embedded content is detected within the captured image stream, and the location of the portable device relative to the display is determined based on the detected embedded content.

19 Claims, 21 Drawing Sheets

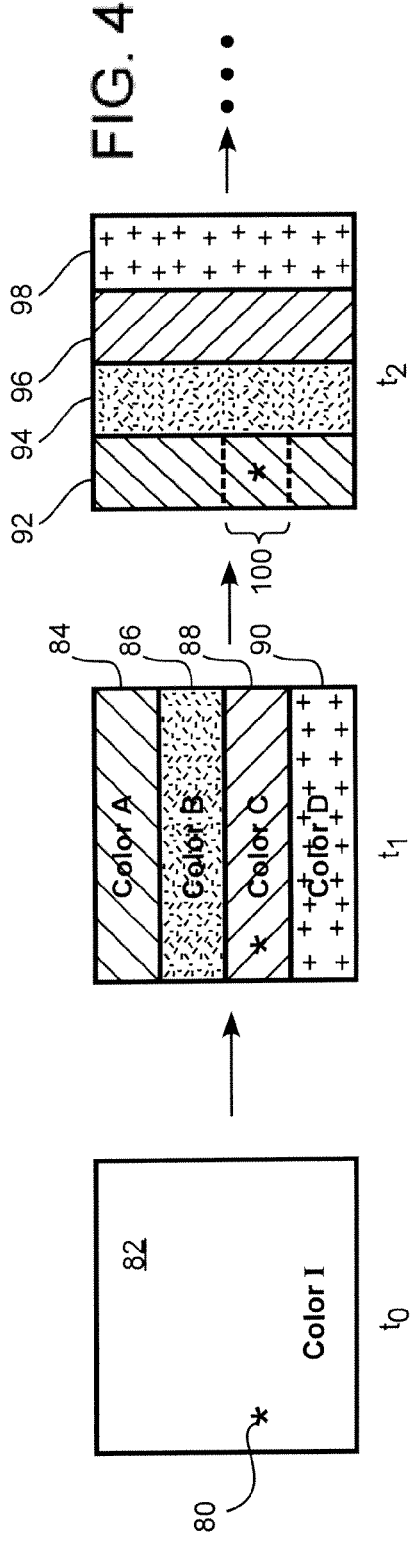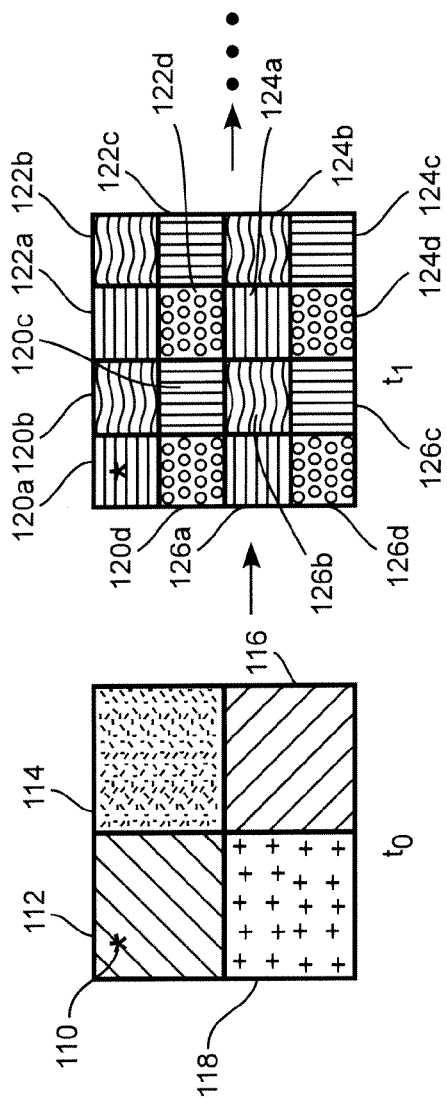

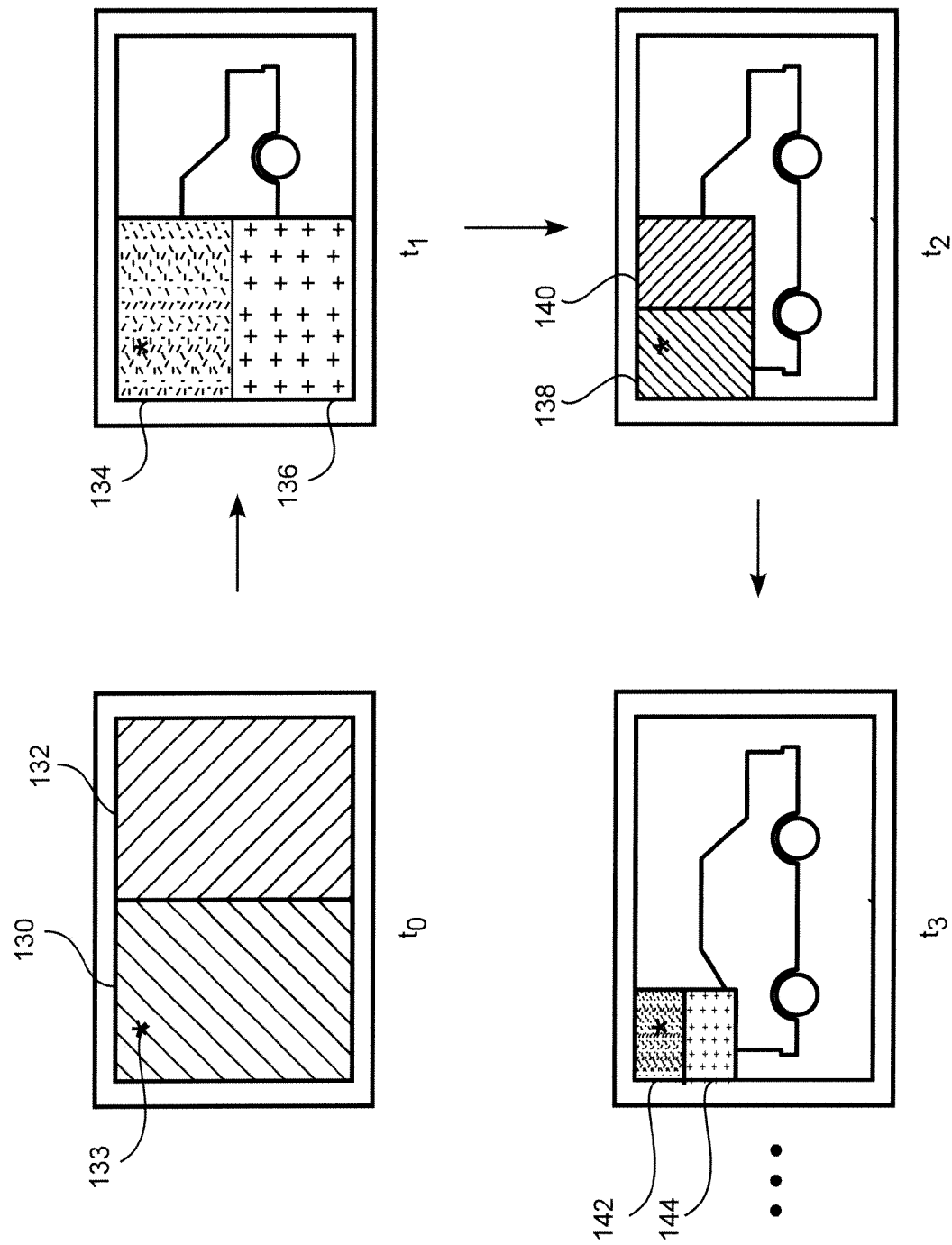

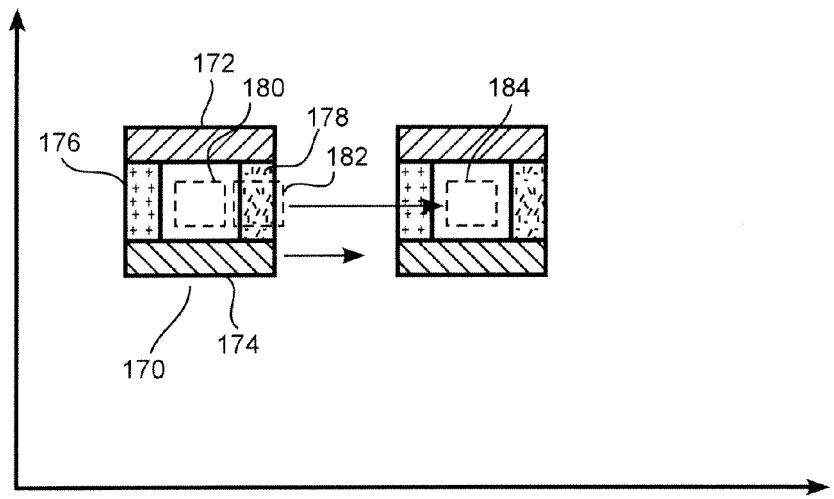
FIG. 8A
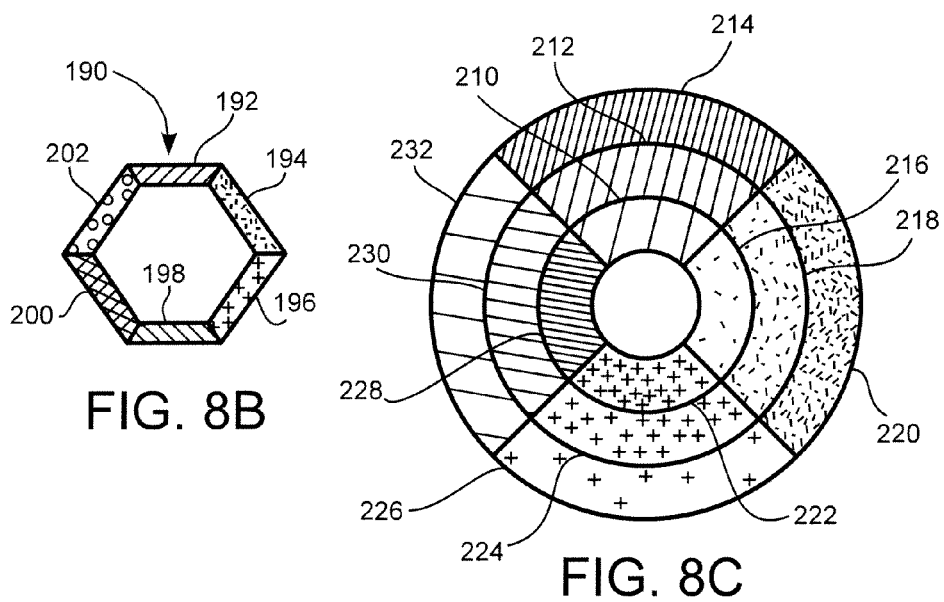
FIG. 8B
FIG. 8C

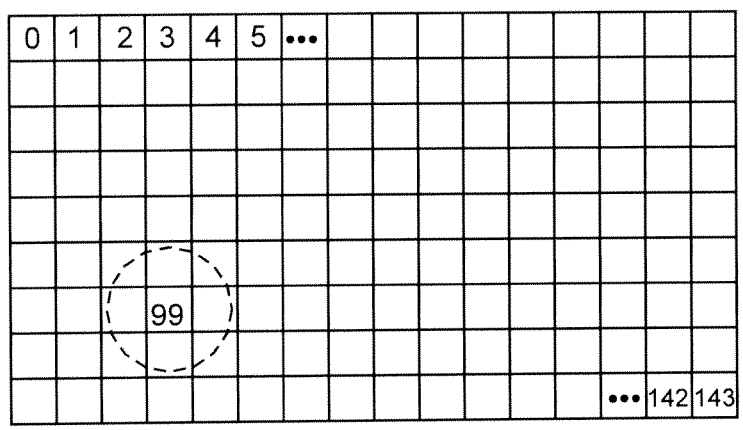
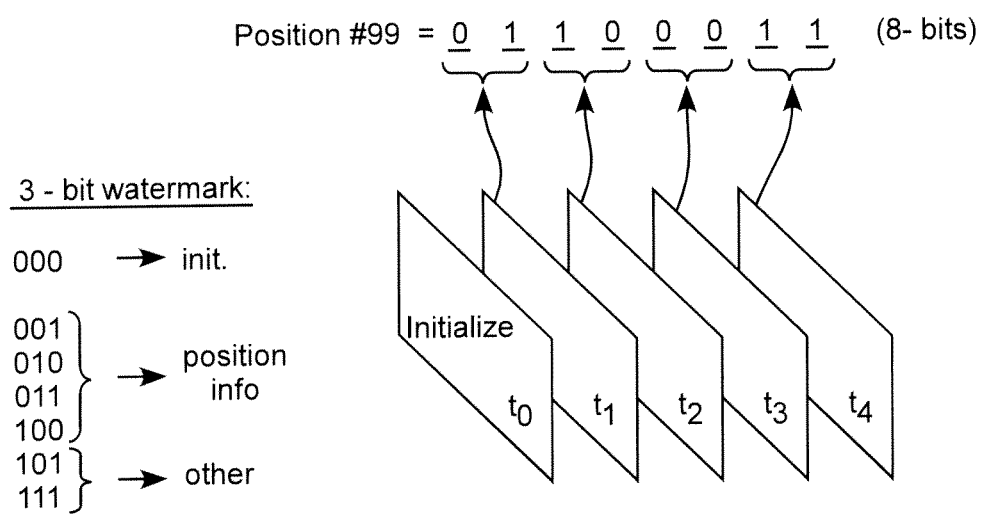
FIG. 10

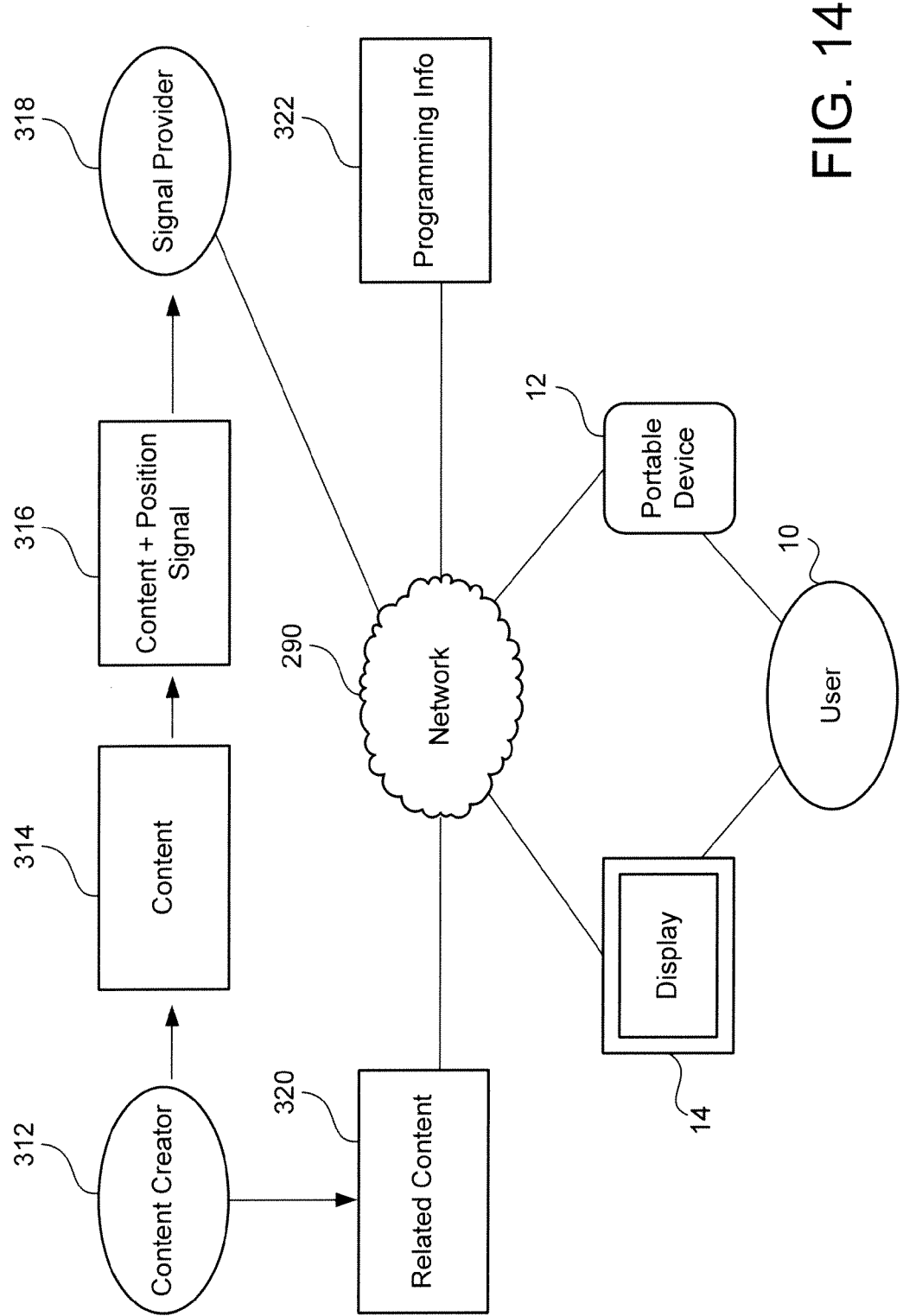

POSITION AND ROTATION OF A PORTABLE DEVICE RELATIVE TO A TELEVISION SCREEN

CLAIM OF PRIORITY

This application claims priority to U.S. Provisional Patent Application No. 61/539,946, filed Sep. 27, 2011, entitled "POSITION AND ROTATION OF A PORTABLE DEVICE RELATIVE TO A TELEVISION SCREEN," the disclosure of which is incorporated by reference herein in its entirety.

BACKGROUND

1. Field of the Invention

The present invention relates to methods and systems for determining position and rotation of a portable device relative to a display screen.

2. Description of the Related Art

A growing segment of the video game industry involves the use of portable hand-held devices. Examples of such portable devices include dedicated gaming devices, such as those manufactured by Sony Computer Entertainment Inc. and others, as well as other types of portable devices such as smartphones, PDA's, digital multimedia players, etc. As the computing power of such portable devices has increased, so has the ability of the portable devices to handle increasingly complex programs and tasks.

For example, today's portable devices may include several different types of hardware integrated into a single device. Many such devices may include a color display, a camera, speakers, and an input mechanism such as buttons, a touchscreen or a stylus.

It is in this context that embodiments of the invention arise.

SUMMARY

Embodiments of the present invention provide methods and systems for enabling determination and tracking of a portable device relative to a display. It should be appreciated that the present invention can be implemented in numerous ways, such as a process, an apparatus, a system, a device or a method on a computer readable medium. Several inventive embodiments of the present invention are described below.

In one embodiment, a method for determining the location of a portable device relative to a display is provided. The method initiates with capturing an image stream by the portable device when the portable device is positioned proximate to the display. The image stream is captured from a region of the display when the display is actively rendering a content stream, the content stream including embedded content for position determination. The embedded content is detected within the captured image stream, and the location of the portable device relative to the display is determined based on the detected embedded content.

In one embodiment, the content stream is defined by a plurality of image frames, and the embedded content is defined by image data embedded in at least a portion of the plurality of image frames.

In one embodiment, the embedded image data defines a sequence of patterns, wherein detecting the embedded content includes detecting a portion of each pattern in the sequence of patterns, and wherein determining the location of the portable device includes analyzing the detected portions of the sequence of patterns.

In one embodiment, each pattern defines a plurality of regions of the display, wherein analyzing the detected portions includes, for each pattern, localizing the portable device to one of the regions defined by the pattern.

In one embodiment, the embedded image data defines a series of digital watermark arrays, each digital watermark array defining a digital watermark for each of a plurality of regions of the display.

In another embodiment, a method for determining the location of a portable device relative to a display is defined. According to the method, a portion of a first image pattern shown on the display is detected, the first image pattern defining a first plurality of regions of the display. Then a portion of a second image pattern shown on the display is detected, the second image pattern defining a second plurality of regions of the display. And a portion of a third image pattern shown on the display is detected, the third image pattern defining a third plurality of regions of the display. The location of the portable device is determined based on the detected portions of the first, second, and third image patterns.

In one embodiment, determining the location of the portable device includes localizing the portable device to one of the first plurality of regions of the display based on the detected portion of the first image pattern, localizing the portable device to one of the second plurality of regions of the display based on the detected portion of the second image pattern, and localizing the portable device to one of the third plurality of regions of the display based on the detected portion of the third image pattern.

In one embodiment, localizing the portable device to one of the second plurality of regions includes localizing the portable device to a portion of the one of the second plurality of regions defined within the one of the first plurality of regions; and localizing the portable device to one of the third plurality of regions includes localizing the portable device to a portion of the one of the third plurality of regions defined within the portion of the one of the second plurality of regions.

In one embodiment, the first image pattern, the second image pattern, and the third image pattern are embedded in a content stream. In one embodiment, the first image pattern, the second image pattern, and the third image pattern are successively repeated within the content stream.

In another embodiment, a method for tracking the location of a portable device relative to a display is provided. The method initiates with determining an initial location of the portable device when the portable device is positioned proximate to the display. A pattern is rendered on the display in a region occupied by the portable device. A portion of the pattern is detected at the portable device, the portion of the pattern corresponding to a lateral movement of the portable device in a plane substantially parallel to a plane defined by a display surface of the display. An updated location of the portable device is determined based on the detected portion of the pattern. The rendering of the pattern is updated based on the determined updated location of the portable device so that the pattern is rendered in an updated region occupied by the portable device.

In one embodiment, detecting the portion of the pattern includes capturing an image stream by a camera of the portable device and analyzing the captured image stream. In one embodiment, the pattern defines a plurality of regions corresponding to different lateral movement directions. In one embodiment, the pattern includes at least four regions surrounding a field of view of the camera of the portable device.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which:

FIG. 4 illustrates a series of patterns for enabling determination of the position of a portable device, in accordance with an embodiment of the invention.

FIG. 5 illustrates a series of patterns for determining the position of the portable device relative to a display, in accordance with an embodiment of the invention.

FIG. 6 illustrates a sequence of patterns for enabling determination of the location of a portable device in a synchronized system, in accordance with an embodiment of the invention.

FIG. 8A illustrates a tracking pattern, in accordance with an embodiment of the invention.

FIG. 8B illustrates a tracking pattern having a hexagonal shape, in accordance with an embodiment of the invention.

FIG. 8C illustrates a tracking pattern having multiple concentric portions, in accordance with an embodiment of the invention.

FIG. 10 illustrates a process for determining the location of a portable device, in accordance with an embodiment of the invention.

FIG. 14 illustrates a system for presenting related content on a portable device 12 based on its location and rotation relative to a display, in accordance with an embodiment of the invention.

DETAILED DESCRIPTION

The following embodiments describe methods and apparatus for a system that enables determination of the location and rotation of a portable device relative to a display, when the portable device is held proximate to or against the display. Broadly speaking, a sequence of patterns is rendered on the display, and a camera of the portable device is utilized to detect portions of the sequence of patterns. Based on the detected portions of the sequence of patterns, the location and rotation of the portable device is determined. The sequence of patterns can be embedded within a content image stream. In some embodiments, the rendering of the sequence of patterns is performed independent of the detection from the camera of the portable device. In other embodiments, the rendering of the sequence of patterns is based on the detection from the camera of the portable device. Accordingly, methods and apparatus in accordance with embodiments of the invention will now be described.

It will be obvious, however, to one skilled in the art, that the present invention may be practiced without some or all of these specific details. In other instances, well known process operations have not been described in detail in order not to unnecessarily obscure the present invention.

Figure 1A:
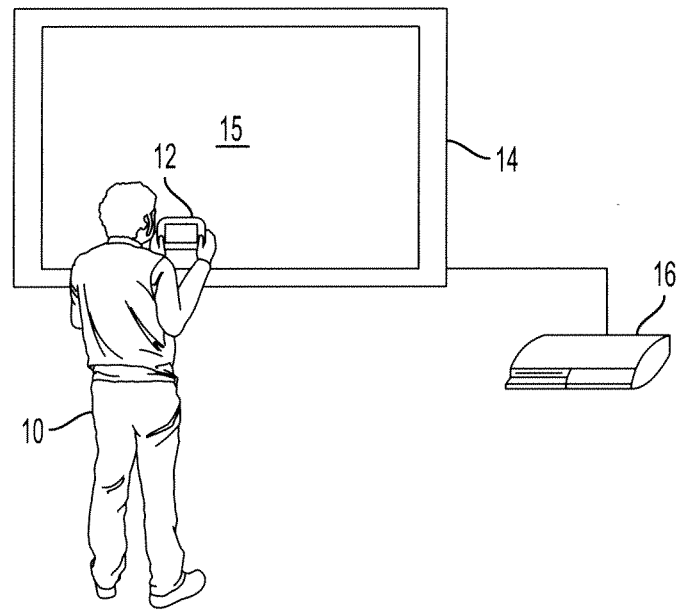
FIG. 1A illustrates an interactive system in accordance with an embodiment of the invention.

FIG. 1A illustrates an interactive system in accordance with an embodiment of the invention. As shown, a user holds a portable device 12 proximate to or against a display surface 15 of a display 14. It will be understood by those skilled in the art that a portable device as defined for purposes of the present disclosure can include any of various types of devices, which can be readily maneuvered or positioned by the user proximate to a display. For example, in various embodiments, the portable device can be a portable gaming device, a cellular phone, a smart phone, a personal digital assistant (PDA), a tablet computer and various other types of devices. The display 14 can be any of various kinds of displays capable of displaying video media or rendering interactive applications. These may include various types of display devices, such as televisions, LCD displays, touchscreen displays and the like. In some embodiments, a console device 16 connects to the display 14. The console device 16 provides a video image stream for rendering on the display 14. In various embodiments, console device 16 can be any type of computing device configured to provide a video image stream to the display 14, such as a gaming console, a set top box, a personal computer, a home theater personal computer (HTPC), etc.

As the user 10 holds the portable device 12 against the display surface 15, the position and rotation of the portable device 12 are determined and tracked. Methods for determining the position and rotation of the portable device 12 are described in further detail below. By enabling the position and rotation of the portable device 12 to be tracked, embodiments of the present invention enable the portable device 12 to be utilized to provide various types of functionality relating to content that is being displayed on the display 14. For example, as the portable device 12 is maneuvered proximate to the display 14, various types of content can be shown on a display of the portable device 12. Such content can include text, images, video, audio, interactive features, interface features, and any of various other kinds of content and functionality relating to content being displayed on the display 14. Various exemplary embodiments are described in further detail below.

Figure 1B:
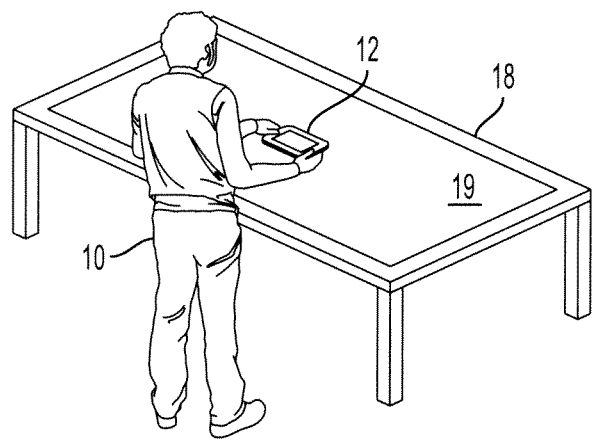
FIG. 1B illustrates a table top display system, in accordance with an embodiment of the invention.

FIG. 1B illustrates a table top display system, in accordance with an embodiment of the invention. As shown, a tabletop display 18 includes a display surface 19. The user 10 positions the portable device 12 on top of the display surface 19 of the tabletop display 18 and maneuvers the portable device 12. The position and rotation of the portable device 12 relative to the tabletop display 18 are determined and tracked. As the position and rotation of the portable device 12 are tracked, content and features are provided via the portable device 12 which relate to content being shown on the tabletop display 18.

Figure 1C:
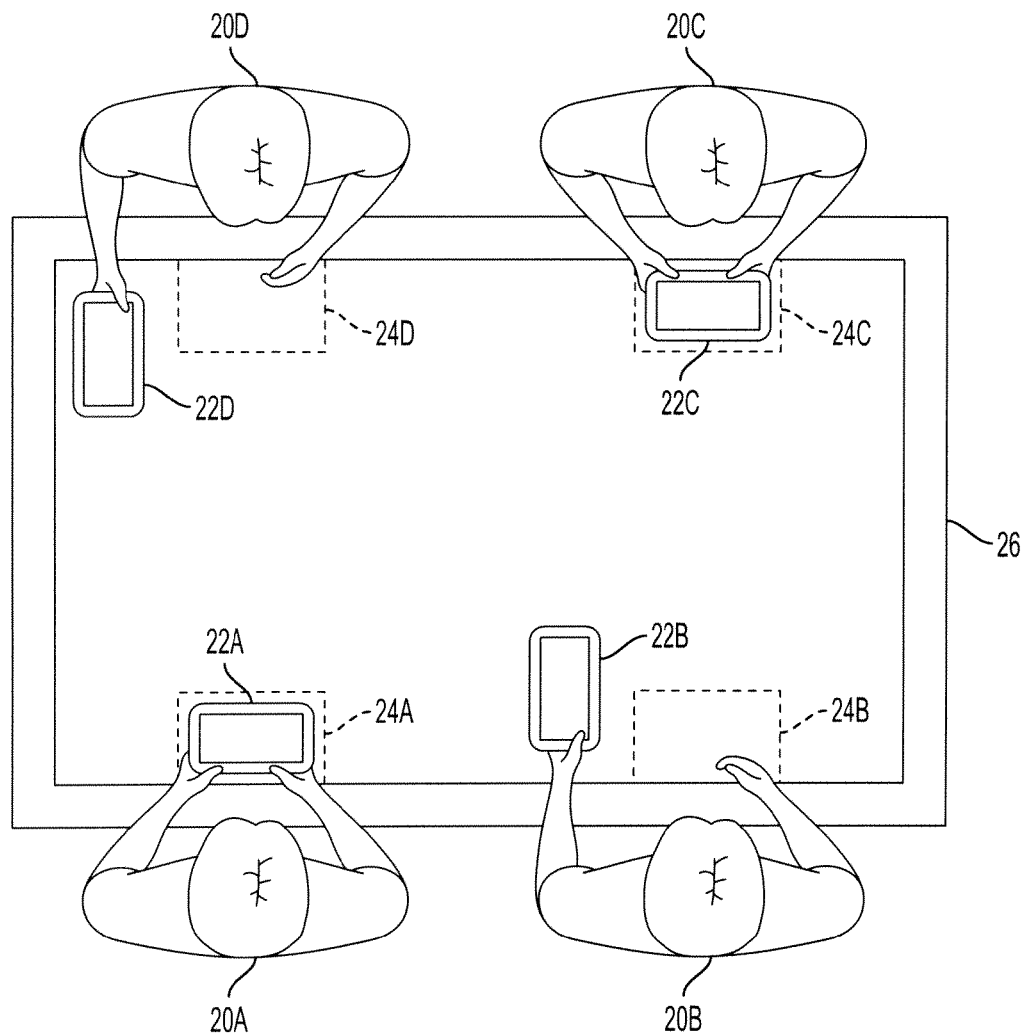
FIG. 1C illustrates an overhead view of a tabletop display system, in accordance with an embodiment of the invention.

FIG. 1C illustrates an overhead view of a tabletop display system, in accordance with an embodiment of the invention. Users 20A, 20B, 20C, and 20D operate portable devices 22A, 22B, 22C, and 22D, respectively. The portable devices are situated on top of tabletop display 26 and maneuvered about the surface of the tabletop display. In one embodiment, an initial position and rotation of each portable device is determined at a designated starting location. For example, a starting location 24 is provided as an initial placement location for the user 20A to position portable device 22A. In one embodiment, the starting location 24 is indicated on the display 26 by rendering a box or other structure on the display 26 that shows where the user 20A should place the portable 22A for initial position determination. When the user 20A positions the portable device 22A in the initial location 24A, the position and rotation of the portable device 22A are determined. Then when the user maneuvers the portable device 22A away from the location 24A, the position and rotation of the portable device 22A relative to the tabletop display 26 are tracked. Similarly, initial locations 24B, 24C, and 24D are provided for initial determination of the position and location of portable devices 22B, 22C, and 22D.

Figure 2A:
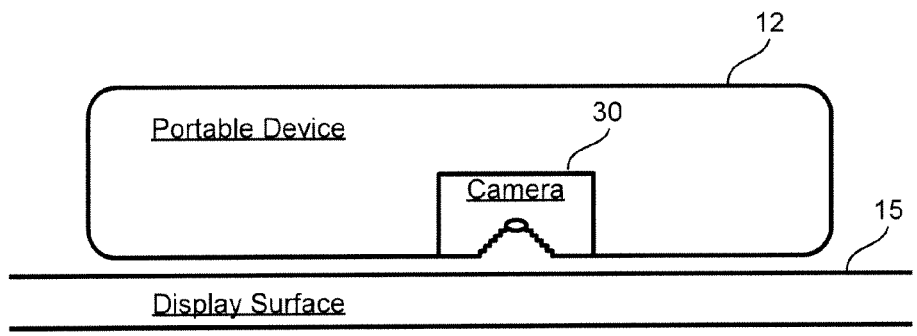
FIG. 2A illustrates a cross-sectional view of an interactive system, in accordance with an embodiment of the invention.

FIG. 2A illustrates a cross-sectional view of an interactive system, in accordance with an embodiment of the invention. As shown, the portable device 12 is situated against the display surface 15. The portable device includes a camera 30 which captures an image stream of a portion of content that is being displayed through the display surface 15. As described in further detail below, the captured image stream is analyzed in order to determine and track the position and rotation of the portable device 12 relative to the display surface 15.

Figure 2B:
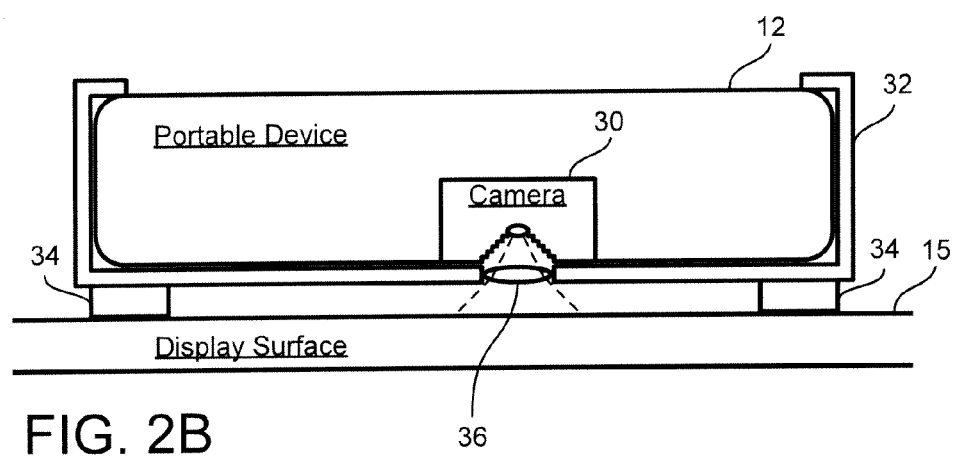
FIG. 2B illustrates a cross-sectional view of an interactive system, in accordance with an embodiment of the invention.

FIG. 2B illustrates a cross-sectional view of an interactive system, in accordance with an embodiment of the invention. The portable device 12 is shown in a holder 32 which prevents direct contact of the portable device against the display surface 15. This prevents the portable device 12 from scratching the display surface 15 when the portable device 12 is moved about the display surface 15. In one embodiment the holder 32 includes various pads 34 which contact the display surface 15. The pads 34 are composed of any kind of material which will not scratch or otherwise damage display surface 15 when moved along the display surface 15. In one embodiment, the holder 32 also includes a lens 36 that aligns with the camera 30 of the portable device 12 when placed in the holder 32. The lens 36 is a wide-angle lens which enables a wider angle of view to be captured by the camera 30.

Figure 3:
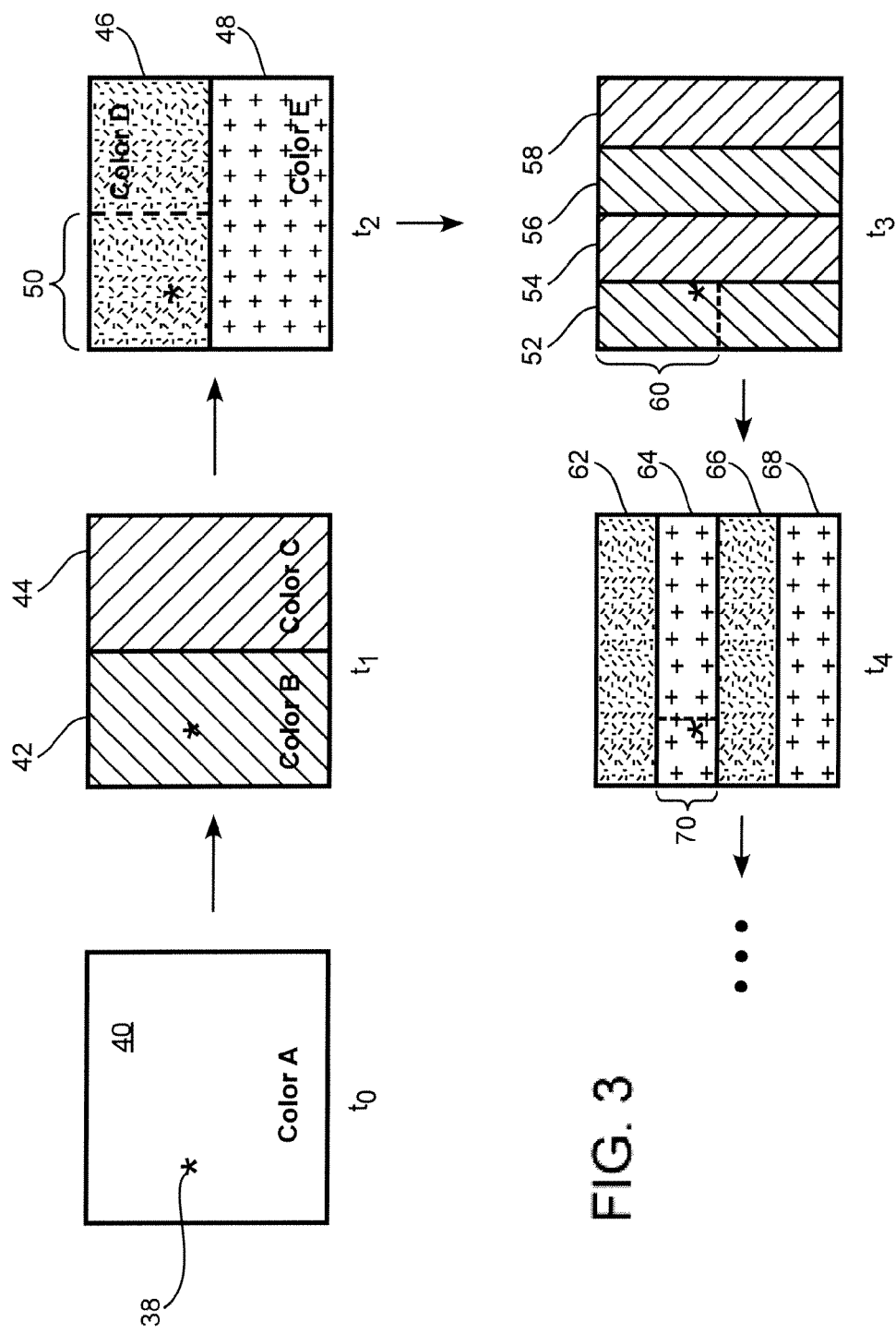
FIG. 3 illustrates a series of patterns shown on a display to enable determination and tracking of a position of a portable device, in accordance with an embodiment of the invention.

FIG. 3 illustrates a series of patterns shown on a display to enable determination and tracking of a position of a portable device, in accordance with an embodiment of the invention. At time $t_0$ an initialization pattern is shown. In one embodiment, the initialization pattern consists of a single region 40 having a color A. As the portable device is situated proximate to the display, the camera of the portable device is directed at a position 38 within the initialization pattern being shown on the display. Thus, at time $t_0$ the camera of the portable device captures an image of the color A. By analyzing the captured image to determine that the color A has been captured, it is determined that the initialization pattern has been shown, and that subsequent patterns will be shown to enable determination of the position of the portable device.

At time $t_1$, a first pattern is shown on the display. In one embodiment, the first pattern defines a region 42 having a color B and a region 44 having a color C. The region 42 and the region 44 vertically divide the display into two halves. Thus, the camera of the portable device at position 38 captures an image of the color B from the region 42. Thus at time $t_1$, it can be determined that the portable device (i.e. the camera of the portable device) is located within the region 42.

At time $t_2$, a second pattern is shown on the display. In one embodiment, the second pattern includes regions 46 and 48 which horizontally divide the display. The region 46 has a color C whereas the region 48 has a color D. As demonstrated, at time $t_2$ the camera of the portable device captures an image of the color C as it is situated within the region 46. Based on the successive image capture of the color B at time $t_1$, and the color D at time $t_2$, the portable device can be localized to a region 50 which is the overlapping area of regions 42 and 46.

At time $t_3$, a third pattern is shown on the display. The third pattern defines regions 52, 54, 56, and 58, which as shown, vertically divide the display into four regions. Regions 52 and 56 have color B whereas regions 54 and 58 have color C. In accordance with the position 38 of the portable device, the camera of the portable device captures an image of the color B. Based on the successive image captures of color B at time $t_1$, color D at time $t_2$, and color B at time $t_3$, the portable device can now be localized to a region 60 which is the overlapping portion of regions 42, 46, and 52.

At time $t_4$, a fourth pattern is shown on the display. The fourth pattern includes regions 62, 64, 66, and 68, which as shown, horizontally divide the display into four regions. Regions 62 and 66 have color D, whereas regions 64 and 68 have color E. In accordance with the location of the camera of the portable device at position 38, the camera captures an image of the color E from region 64 of the fourth pattern. Therefore, based on the successive image captures of color B at time t1, color D at time t2, color B at time t3, and color E at time t4, portable device (i.e. the portion from which the camera of the portable device captures an image) can be localized to a region 70, which is the overlapping portion of regions 42, 50, 52, and 64.

As can be seen, as each successive image capture from each pattern is analyzed, the position of the portable device is localized to a smaller and smaller area. At time t1, the portable device is localized to the region 42 which is a subset of the region 40. At time t2, the portable device is localized to the portion of region 46 that is a subset of the region 42. At time t3, the portable device is localized to a portion of region 52 that is a subset of the region 46. And at time t4, the portable device is localized to the portion of region 64 that is a subset of the region 52. The foregoing embodiment illustrates a configuration in which the patterns divide the display area into successively smaller and smaller horizontal or vertical regions. Four colors are utilized for position determination, with two colors B and C being shown together and colors D and E being shown together in alternating patterns. In other words, no two successive patterns display the same color. In this manner, a change in color is always detected in captured images from successive patterns.

With each successive pattern and image capture from that pattern, the portable device can be localized to a smaller and smaller area. Accordingly, the total number of patterns shown in the sequence may depend on the degree of specificity with which the location of the portable device is desired to be known. The sequence of patterns can be cycled to enable repeated determination of the location of the portable device, and thereby facilitate tracking of the position of the portable device. Additionally, the patterns can be embedded in an image stream, for example, by periodically substituting frames of the image stream with frames containing patterns from the sequence.

In alternative embodiments, the patterns may have alternative configurations which divide the display area into any of various shapes and sizes, with successive patterns enabling localization of the portable device to successively smaller areas. The foregoing embodiment has been described with reference to five colors defined in the patterns. In alternative embodiments, any number of colors may be utilized. With a greater number of colors, it is possible to localize the portable device to a smaller area within a given pattern. In still other embodiments, other recognizable visual elements may be utilized in the patterns instead of or in addition to colors, such as various types of patterning, digital watermarking, or other visual elements which can be recognized from a captured image of the displayed element.

It will be appreciated that in embodiments of the invention the sequence of patterns can be embedded within a content image stream, the content image stream containing content to be rendered on the display apart from the position determination function of the sequence of patterns. For example, the content image stream may be composed of a sequence of image frames. The sequence of patterns can be embedded in the content image stream by replacing or altering some of the image frames of the content image stream. In one embodiment, one of the patterns in the sequence of patterns replaces every nth image frame of the content image stream. In another embodiment, every an image frames of the content image stream is altered so as to include a pattern in the sequence of patterns. In some embodiments at every nth frame within the content image stream, two or more image frames are substituted or altered so as to display one or more patterns from the sequence of patterns. The sequence of patterns is embedded within the content image stream for the duration during which it is desired to enable determination of the location and orientation of the portable device.

Typically, the sequence of patterns embedded in the content image stream is cycled or repeated. In order to determine position of a portable device when held proximate or against the display, a camera of the portable device is activated to capture images from the display. The captured images are analyzed to detect the initial pattern as well as portions from successive patterns so as to enable determination of the position of the portable device. In one embodiment, the portable device is synchronized to the sequence of patterns by repeatedly detecting the initialization pattern.

FIG. 4 illustrates a series of patterns for enabling determination of the position of a portable device, in accordance with an embodiment of the invention. At time $t_0$ an initial pattern is shown, the initial pattern being defined by a singular region 82. In the illustrated embodiment, the camera of the portable device is centered at a location it as the portable device is held proximate to or against the display. In one embodiment, the region 82 defined by the initial pattern has a color I. Therefore, at time $t_0$ the camera of the portable device captures an image of the color I. Based on the captured image of the color I, it is determined that the initial pattern has been shown, thereby indicating the start of the sequence of patterns to the shown in the presently described embodiment.

At time $t_1$, a first localization pattern is shown on the display, the first localization pattern defining for separate regions 84, 86, 88, and 90. The regions 84, 86, 88, and 90 horizontally divide the display into four equivalent regions. In one embodiment, region 84 has a color A; region 86 has a color B; region 88 has a color C; and region 90 has a color D. As each of the regions 84, 86, 88, and 90 have unique colors, the portable device can be localized to one of the four regions based on a captured image taken by the camera of the portable device. In the illustrated embodiment wherein the camera of the portable device is situated at location 80, the camera of the portable device captures an image of the color C from the region 88. I analyzing the captured image, it can thus be determined that the portable device is located within the region 88.

At time $t_2$ and a second pattern shown on the display, the second pattern defining regions 92, 94, 96, and 98. In one embodiment, the regions 92, 94, 96, and 98 vertically divide the display into four equivalent regions. In the illustrated embodiment, region 92 has color A; region 94 has color B; region 96 has color C; and region 98 has color D. In an alternative embodiment, the colors of the regions 92, 94, 96, and 98 are all distinct from the colors of the regions defined by the first pattern. As the portable device is situated at location 80, the camera of the portable device captures an image from the region 92 of the color A. Therefore, based on the successive image capture of the color C from region 88 at time $t_1$ followed by the color A from the region 92 at time $t_2$, it can be determined that the portable device is located within a region 100, which is the portion of the region 92 overlapping with the region 88.

Successively displayed patterns can be configured to define increasingly finer subdivisions of the display, so as to enable more accurate determination of the location of the portable device. It will be understood by those skilled in the art that in other embodiments of the invention, various other types of visual elements and arrangements of regions can be utilized to facilitate position determination and tracking of the portable device.

FIG. 5 illustrates a series of patterns for determining the position of the portable device relative to a display, in accordance with an embodiment of the invention. At time $t_0$, a first pattern is shown which defines equivalent rectangular regions 112, 114, 116, and 118. In the illustrated embodiment, the camera a portable device is directed at a location 110 as the portable device is held proximate to or against the display. Each of the regions 112, 114, 116, and 118 has a unique color or pattern. As the portable device is situated at location 110, the camera of the portable device captures an image from the region 112. By analyzing the captured image, it can be determined that the captured image is of the color or pattern of the region 112, and hence the portable device is located within the region 112.

At time $t_1$, a second pattern is shown on the display, the second pattern defining four equivalent rectangular regions for each one of the regions defined by the first pattern. As shown, the second pattern includes regions 120A, 120B, 120C, and 120D which together occupy a same area of the display as that of region 112 of the first pattern. Similarly, the second pattern includes regions 122A, 122B, 122C, and 122D which together occupy a same area of the display as the region 114 of the first pattern; regions 124A, 124B, 124C, and 124D which together occupy a same area of the display as the region 116 of the first pattern; and regions 126A, 126B, 126C, and 126D which together occupy a same area of the display as the region 118 of the first pattern. In one embodiment, each of regions 120A, 122A, 124A, and 126A has a same color or pattern; each of regions 120B, 122B, 124B, and 126B has a same color or pattern; each of regions 120C, 122C, 124C, and 126C has a same color or pattern; and each of regions 120D, 122D, 124D, and 126D has a same color or pattern. In one embodiment, the colors or patterns utilized in the second pattern shown at time $t_1$ are distinct from the colors or pattern shown in the first pattern at time $t_0$.

In accordance with the position of the portable device at location 110, the camera of the portable device captures an image from the region 120A at time $t_1$. By analyzing and determining the color or pattern in the captured image from the second pattern, in conjunction with that from the first pattern, it can be determined that the captured image the second pattern was captured from the region 120A. And thus, the camera of the portable device is located within the region 120A. In various embodiments, successively displayed patterns can be configured to further subdivide the regions defined by a preceding pattern, thus enabling increasingly accurate determinations of the location of the portable device.

In the above described pattern sequences, it has generally been assumed that the display of the sequence of patterns is performed independently of the image capture at the portable device and the subsequent analysis of the captured images. In such embodiments, it is contemplated that the sequence of patterns can be embedded in a video image stream that is rendered on a display. Then when a portable device configured to capture images from the image stream is positioned proximate to the display, the images captured by the portable device from the display can be analyzed in order to determine the location of the portable device relative to the display, in accordance with the principles described herein.

However, in other embodiments a sequence of patterns for enabling position determination of the portable device is actively embedded within a content stream at the time of rendering. The particular pattern shown in a given image frame of the content stream is determined based on a known localization of the portable device. Thus, in such embodiments the image capture five portable device and subsequent analysis of the captured images is synchronized with the rendering of patterns on the display.

FIG. 6 illustrates a sequence of patterns for enabling determination of the location of a portable device in a synchronized system, in accordance with an embodiment of the invention. At time $t_0$, a first pattern is shown on the display, the first pattern defining two regions 130 and 132. In one embodiment, each of the regions 130 and 132 has a distinct color or pattern. In the illustrated embodiment the portable device is situated at a location 133. Thus, at time to the portable device captures an image from the region 130 of the first pattern. By analyzing the captured image to detect the color or pattern within the region 130, it is determined that the portable device is located somewhere within the region 130.

Accordingly, a subsequent second pattern rendered on the display at time $t_1$ only occupies the area of the display corresponding to the region 130 of the first pattern. As shown, the second pattern defines regions 134 and 136, each of which has a distinct color or pattern. As the portable device is situated at location 133, it captures an image from the region 134 within the second pattern. By analyzing the captured image, it is determined that the portable device is located somewhere within the region 134 of the second pattern.

Therefore, a subsequent third pattern rendered on the display at time $t_2$ only occupies a portion of the display corresponding to the region 134 of the second pattern. As shown, in one embodiment the third pattern defines regions 138 and 140, each of which has a distinct color or pattern. The portable device being situated at location 133 captures an image from the region 138 of the third pattern. I analyzing the captured image it is determined that the portable device is situated somewhere within the region 138.

A subsequent fourth pattern rendered on the display at time T3 therefore only occupies a region of the display corresponding to the region 138 of the third pattern. The fourth pattern defines regions 142 and 144, each of which has a distinct color or pattern. As the portable device is situated at location 133, at time $t_3$ portable device captures an image from the region 142 of the fourth pattern. By analyzing the captured image is determined that the portable device is located somewhere within the region 142.

It will be apparent that at subsequent times, subsequent patterns can be shown to further localize the portable device with increasing accuracy. As demonstrated by the aforementioned embodiment, subsequent patterns in the sequence of patterns occupy an increasingly smaller portion of the display. This is made possible by first localizing the portable device to a particular region within a given pattern and then determining a subsequent pattern to occupy only that region within which the portable device has already been localized. By generating and rendering patterns which occupies smaller region of the display, the impact on the overall image only of the rendered content stream is diminished as compared to pattern sequences which occupy the entirety of the display each time a pattern is shown.

Figure 7A:
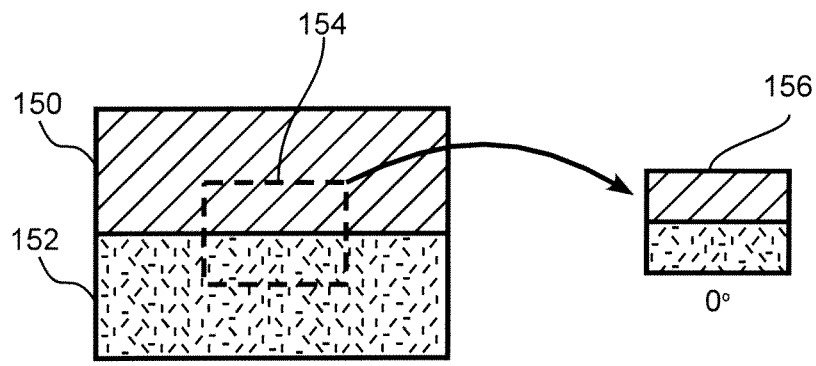
FIGS. 7A, 7B, and 7C illustrate the determination of the rotation of a portable device based on captured images from a displayed pattern, in accordance with an embodiment of the invention.
Figure 7B:
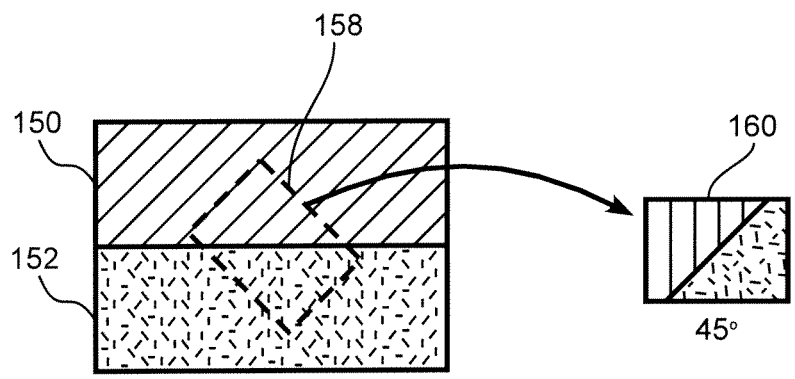
Figure 7C:
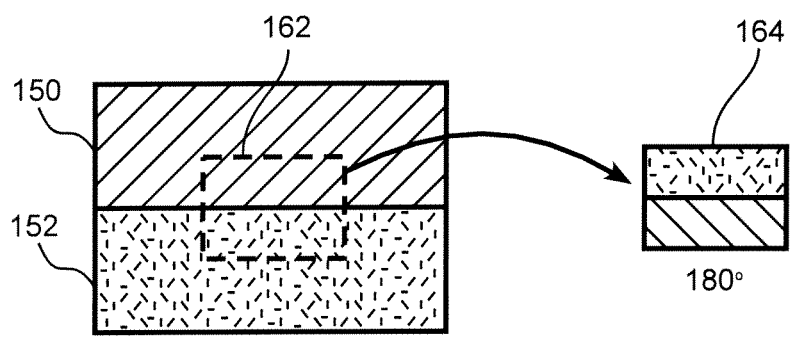

FIGS. 7A, 7B, and 7C illustrate the determination of the rotation of a portable device based on captured images from a displayed pattern, in accordance with an embodiment of the invention. With reference to FIG. 7A, a portion of a pattern shown, including regions 150 and 152. The regions 150 and 152 each have a distinct color or pattern from the other, and are arranged within the pattern so that no other adjacent regions utilize the same two colors or patterns has regions 150 and 152. When the camera of the portable device is positioned at the interface between regions 150 and 152, it captures an image including portions of both regions. Based on this captured image, and because no other two adjacent regions utilize the same distinct colors or patterns has regions 150 and 152, it is possible to determine the orientation of the portable device by analyzing the captured image. At FIG. 7A, the portable device is oriented at 0° and its camera is directed at portion 154 of the pattern. As such, the portable device captures image 156, and based on analysis of an image 156, it can be determined that the portable device has a rotation of 0°.

At FIG. 7B, the portable device has a rotation of 45°. The camera of the portable device is directed at the portion 158 of the pattern, and therefore captures image 160. By analyzing image 160, it can be determined that the portable device has a rotation of 45°.

At FIG. 7C, the portable device has a rotation of 180°. The camera of the portable device is directed at portion 162 and therefore captures image 164. By analyzing the image 164, in can be determined that the portable device has a rotation of 180°.

Accordingly, the rotation of the portable device can be determined based on analysis of a captured image by the camera of the portable device of an interface between two regions of a pattern. The combination of the interfacing colors or patterns at the interface of the two regions must be unique within the displayed pattern if the interface is a straight line. However, in alternative embodiments, the interface between regions may be configured to be asymmetrical across the interface (i.e. the interfacing portions of the adjacent regions are not symmetrical). Thus, the interface is directional in nature, and when a portion of the interface is captured by the camera of the portable device, the rotation of the portable device can be ascertained based on the orientation of the interface line in the captured image.

It will be appreciated that to determine rotation based on detection of an interface line between two regions, the camera of the portable device must be positioned over the interface line in the first instance. In various embodiments, this may occur at various time points within a sequence of patterns based on the location of the portable device and the particular configuration of the patterns. To ensure that rotation can be determined during a given cycle of a sequence of patterns, at least one of the patterns in the sequence must have a maximum region width that is less than a minimum diameter of images captured by the camera of the portable device. Such a pattern ensures that an image of an interface between regions is captured by the portable device.

In alternative embodiments, a sequence of patterns may define regions which themselves include an asymmetrical patterning. Such asymmetrical patterning can be detected and utilized to determine the rotation of the portable device.

FIG. 8A illustrates a tracking pattern, in accordance with an embodiment of the invention. The tracking pattern 170 is shown on the display to facilitate tracking of the location of the portable device. In one embodiment, the tracking pattern 170 includes various regions surrounding a field of view of the camera of the portable device. As shown, the tracking pattern 170 includes a top region 172, a bottom region 174, a left region 176, and a right region 178. In one embodiment, the initial position of the portable device is first determined in accordance with the principles described herein. Then to facilitate tracking of the portable device the tracking pattern 170 is rendered on the display surrounding the field of view 180 of the camera of the portable device at its initial location.

When the portable device is moved, the field of view of the portable device moves over one of the regions defined by the tracking pattern. By analyzing captured images from the camera of the portable device to determine which of the regions of the tracking pattern appear in the images, it is possible to determine the directional movement of the portable device. For example, in the illustrated embodiment the portable device has been moved to the right, and the field of view 180 moves to a new field of view 182. As such, captured images from the portable device include the color or pattern defined for the region 178 of the tracking pattern 170. By analyzing the captured images, it is determined that they contain the color or pattern corresponding to region 178, and therefore that the portable device has been moved to the right. Additionally, by analyzing the location within the captured images of the color or pattern corresponding to regions of the tracking pattern, it is possible to also determine the speed with which the portable device is being moved.

As the portable device is moved, and as the movement is detected as described above, the tracking pattern is redrawn so as to enable continual tracking of the movements of the portable device. In other words, the tracking pattern is continuously updated or re-rendered so as to be situated in a location centered about the camera of the portable device, and thereby enable continued detection of the movements of the portable device. In the illustrated embodiment for example, the field of view of the camera of the portable device is moved to location 184, and the tracking pattern 170 has also been moved so as to be centered about the field of view of the camera of the portable device. It will be appreciated that the changed location of the tracking pattern 170 can be determined by predicting the future location of the portable device. Based on the direction and speed of the movement of the portable device as determined above, an approximate future location of the camera of the portable device can be extrapolated, and the tracking pattern 170 can be moved to the anticipated future location of the camera of the portable device.

It will be appreciated by those skilled in the art that in other embodiments, the tracking pattern may have any shape or configuration surrounding a field of view of the camera of the portable device. For example, FIG. 8B illustrates a tracking pattern 190 having a hexagonal shape. As shown, the tracking pattern 190 defines regions 192, 194, 196, 198, 200, and 202, each of which have a distinct color or pattern. In other embodiments, a tracking pattern may be sized or defined so as to include portions within the field of view when centered about the camera of the portable device. In some embodiments, a tracking pattern is defined to be smaller than the field of view of the camera of the portable device.

FIG. 8C illustrates a tracking pattern having multiple concentric portions, in accordance with an embodiment of the invention. The tracking pattern includes a top inner region 210, a top intermediate region 212, and a top outer region 214; a right inner region 216, a right intermediate region 218, and right outer region 220; a bottom inner region 222, a bottom intermediate region 224, and a bottom outer region 226; a left inner region 228, a left intermediate region 230, and a left outer region 232. As of the portable device is moved in a given direction, the camera of the portable device traverses from the inner regions to the outer regions. The more quickly the portable device is moved, the more quickly the camera will traverse from the inner to the outer regions. By utilizing multiple concentric regions, it is therefore possible to more accurately determine the speed and location of the portable device.

Figure 9:
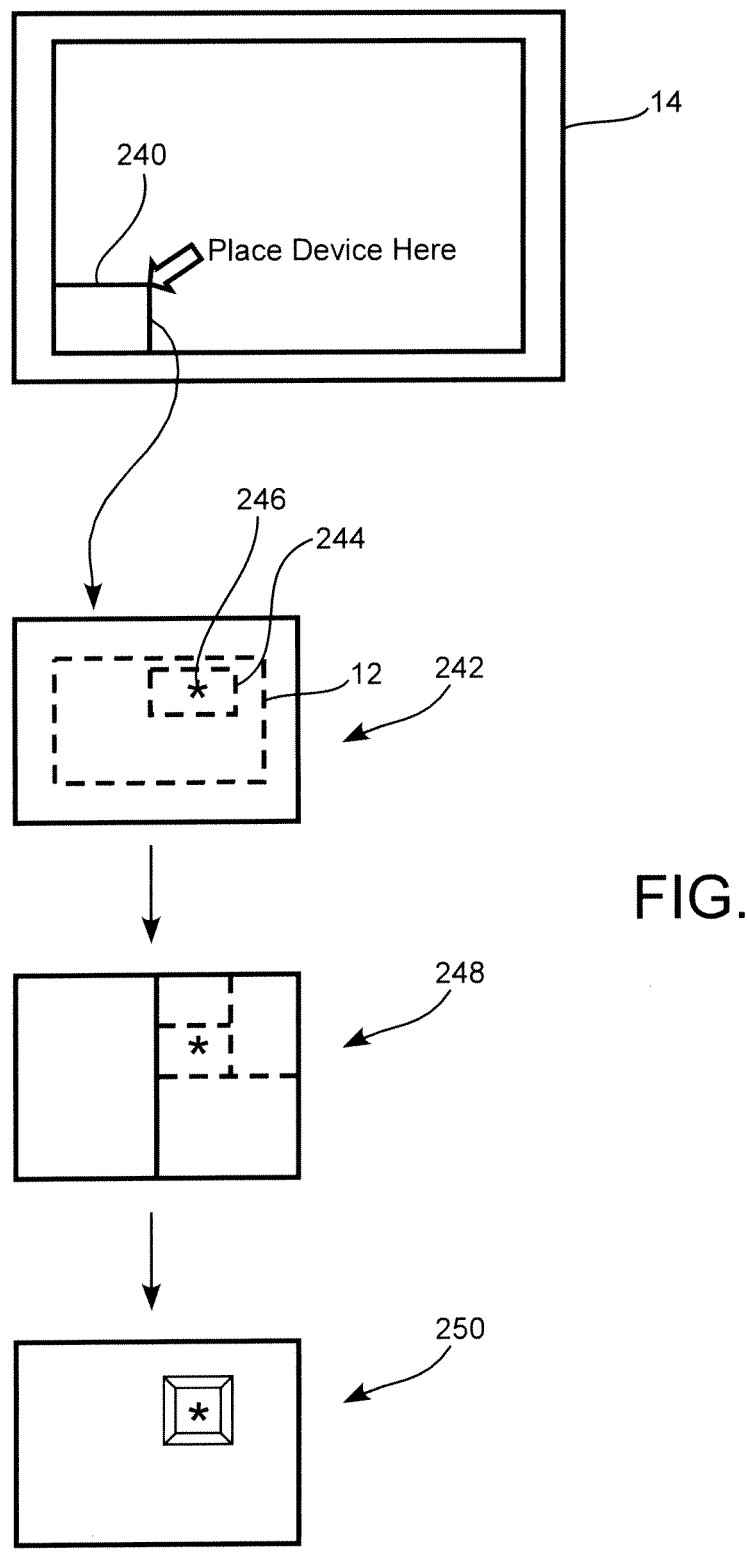
FIG. 9 illustrates an initialization process, in accordance with an embodiment of the invention.

FIG. 9 illustrates an initialization process, in accordance with an embodiment of the invention. As shown, and initialization region 240 is rendered on the display 14, and the user is directed to place the portable device 12 within the initialization region 240. As shown at reference 242 when the portable device 12 is placed within the initialization region 240, the field of view 244 of the camera of the portable device 12 is centered about a location 246. As shown at reference 248, the specific location 246 is determined based on localization techniques as described herein. Once the location of the portable device is known, the system switches to a tracking mode hand renders a tracking pattern as shown at reference 250.

FIG. 10 illustrates a process for determining the location of a portable device, in accordance with an embodiment of the invention. As shown, a displays divided into a 16×9 array of regions, which have been numbered 0 to 143. In order to express a given region in the array, eight bits must be defined. In one embodiment, a three bit watermark is utilized to communicate information through the regions on the display. In one embodiment, one combination of the three bit watermark is reserved for initialization, four combinations of the three bit watermark are utilized for position determination, and to combinations of three bit watermark are reserved for other purposes. Thus by rendering the three bit watermark each of the regions in a given sequence, and each time point in the sequence, it is possible to determine to of the bits of eight bits required express the exact location of the portable device.

By way of example, as shown, the portable device is located at region 99. In order to determine this, the portable device captures images from the display and extracts information based on the three bit watermark rendered at the region 99. At time $t_0$, and initialization code is rendered in each of the regions using the three bit watermark. At time $t_1$, the watermark rendered at region 99 utilizes those combinations of the three bit watermark reserved for position determination to communicate the first $\frac{2}{3}$ of the eight bit combination required to determine the location of the portable device. At subsequent times $t_2$, $t_3$, and $t_4$, a similar process occurs to determine the remaining bits of the 8-bit combination, thereby yielding the location of the portable device at the region 99. The foregoing embodiment has been described with reference to a particular array and a particular watermark for illustrative purposes only. In various embodiments of the invention, it will be appreciated that the display can be subdivided into any number of regions, and watermarks displayed in the regions can be configured to communicate any number of bits of information. Various types of digital watermarking techniques can be employed in embodiments of the invention to enable determination of the position of the portable device.

Figure 11A:
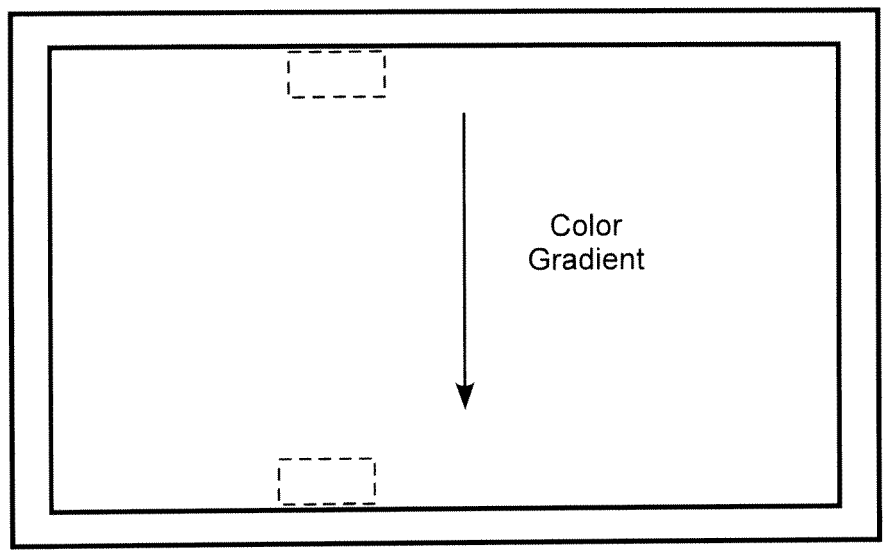
FIG. 11A illustrates a display having a vertical color gradient rendered upon it, in accordance with an embodiment of the invention.
Figure 11B:
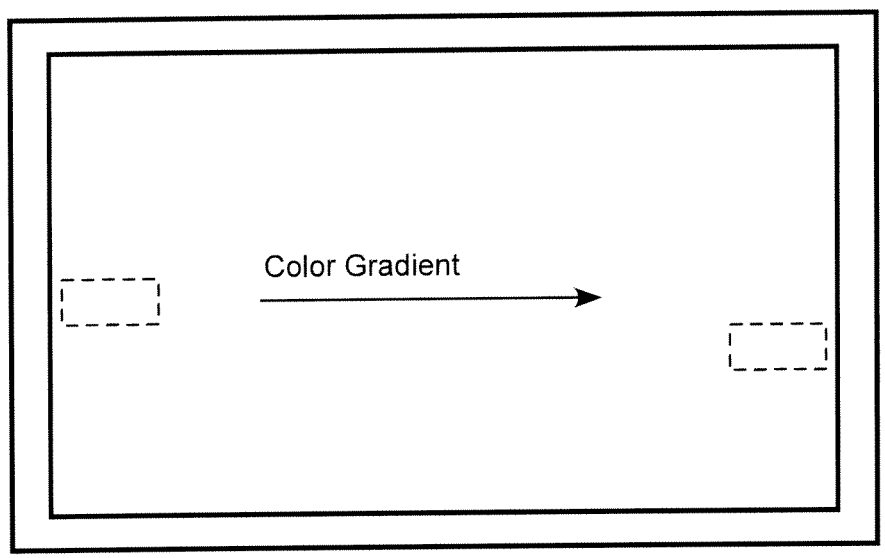
FIG. 11B illustrates a display having a horizontal color gradient varying from left to right.

Embodiments of the invention have generally been described with reference to a number of defined regions of patterns rendered on a display to facilitate determination of the position and orientation of a portable device. However, in other embodiments is contemplated that gradients may be utilized. FIG. 11A illustrates a display having a vertical color gradient rendered upon it, in accordance with an embodiment of the invention. As shown, the color gradient varies from top to bottom of the display. By analyzing a captured image from a portable device held proximate to the display when rendering the vertical gradient, it is possible to determine the portable devices vertical location relative to the display based on the detected color in the captured image. FIG. 11B illustrates a display having a horizontal color gradient varying from left to right. In a similar manner, by analyzing a captured image from the portable device when the display renders the horizontal color gradient, it is possible to determine the portable devices horizontal location relative to the display.

Figure 12:
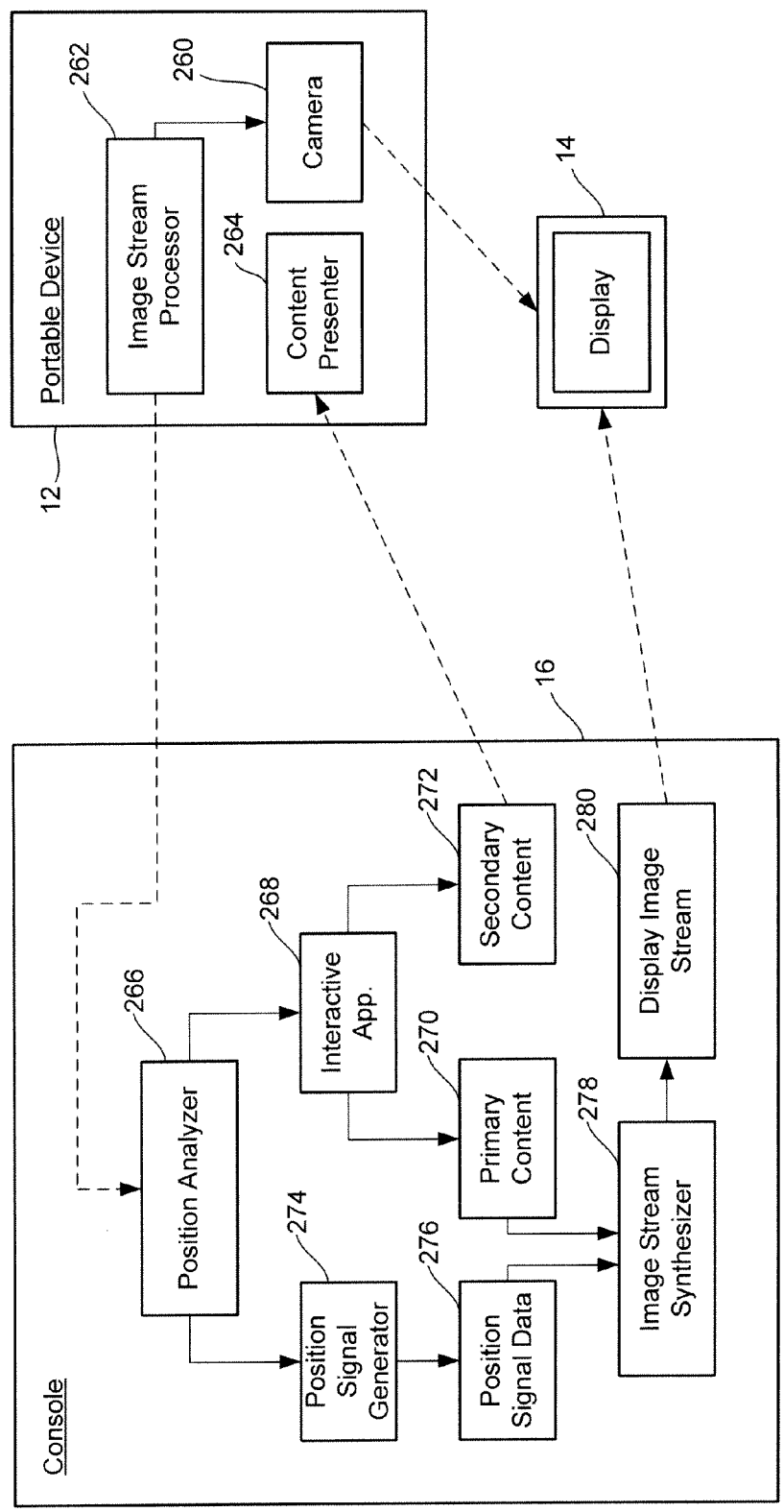
FIG. 12 illustrates a system for presenting content on a portable device based on its detected position relative to a display, in accordance with an embodiment of the invention.

FIG. 12 illustrates a system for presenting content on a portable device based on its detected position relative to a display, in accordance with an embodiment of the invention. The portable device 12 includes a camera 260 which captures an image stream from a display 14 as the portable device 12 is held proximate to or against the display 14. An image stream processor 262 performs initial processing of the image stream from the camera 260 for purposes of determining the location and rotation of the portable device. In one embodiment, the image stream processor 262 extracts image data from images captured when patterns from a sequence of patterns are shown on the display 14 for position determination. In one embodiment, the image stream processor 262 may perform additional processing of such extracted image data. In one embodiment, the image stream processor 262 then communicates the processed image data to a position analyzer 266 of the console.

The position analyzer 266 determines, based on the received processed image data, the position of the portable device 12 relative to the display 14, including its location and rotation. The position analyzer 266 communicates the location and rotation of the portable device 12 to an interactive application 268. The interactive application 268 generates a primary content stream 270 and a secondary content stream 272. The secondary content stream 272 is generated based on the location and rotation of the portable device 12, and communicated to the portable device 12 to be presented by content presenter 264.

Additionally, the position analyzer 266 communicates the location and rotation of the portable device 12 to a position signal generator 274, which generates position signal data 276. In one embodiment, the position signal data includes image data for a sequence of patterns to be displayed to enable determination of the location and rotation of the portable device 12 relative to the display 14. An image stream synthesizer 278 combines the position signal data 276 with the primary content stream 270, for example, by embedding the position signal data 276 in the primary content stream 270. The result of this synthesis is a display image stream 280 that is communicated to display 14 and rendered thereon.

Though the foregoing embodiment has described functionality of the system divided between the console 16 and the display 14, in another embodiment, the functionality of the console 16 and the display 14 may be integrated in the same device. Such a device can be a networked display, integrated computer device, or any other device containing both processing hardware and display hardware in the same device which can perform the functionality of both the console 16 and display 14 as herein described.

Figure 13:
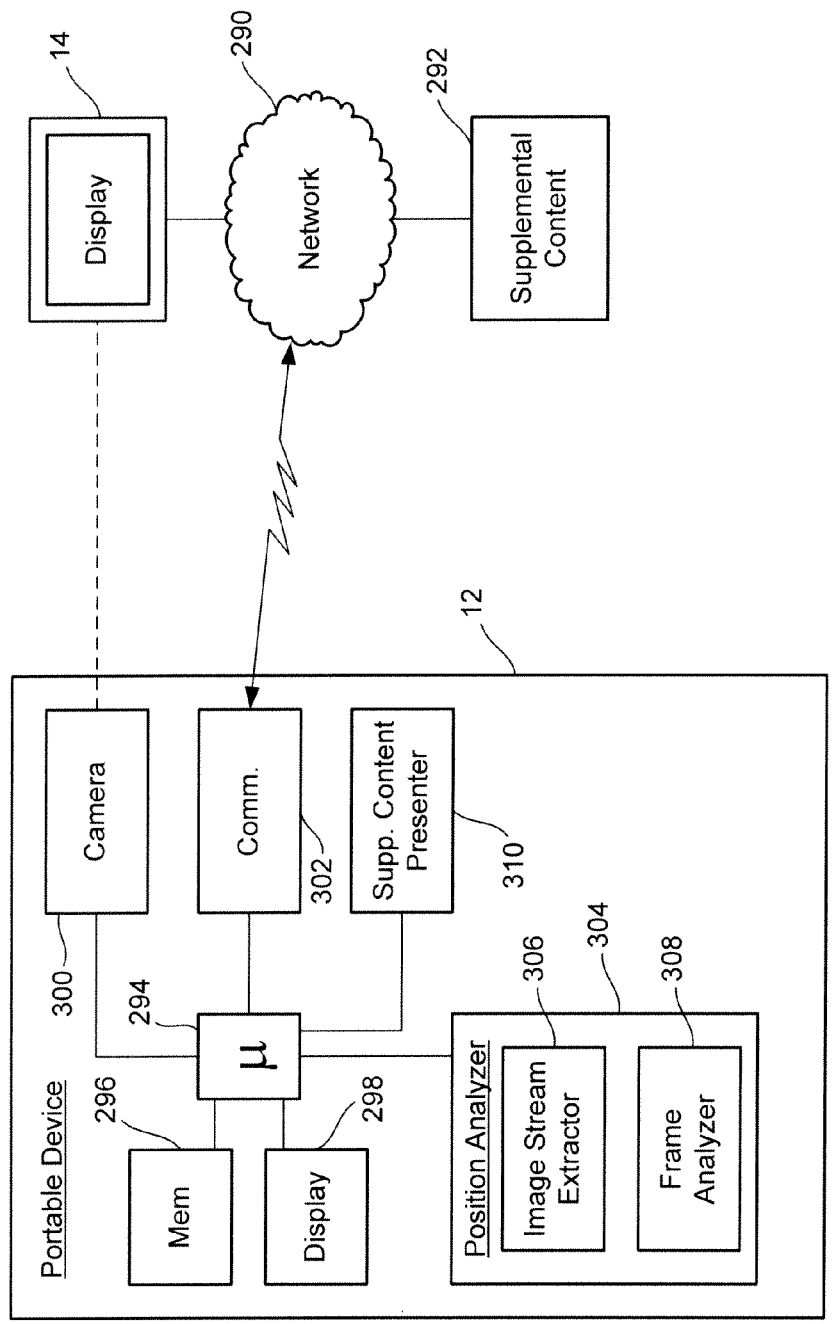
FIG. 13 illustrates a system for providing supplemental content on a portable device based on its position relative to a display, in accordance with an embodiment of the invention.

FIG. 13 illustrates a system for providing supplemental content on a portable device based on its position relative to a display, in accordance with an embodiment of the invention. Primary content is rendered on a display 14, with image frames containing patterns or watermarks for facilitating determination of the location and rotation of the portable device 12, in accordance with principles described herein. In one embodiment, the display 14 is a networked display including hardware for executing program instructions and connecting to network 290. The network 290 may be any kind of network useful for transmitting data, such as a LAN, WAN, the Internet, cable/satellite network, or other types of networks.

The portable device 12 includes a processor 294 and memory 296 for executing program instructions. A display 298 is included in the portable device 12 for rendering content and providing an interface mechanism via touch-screen functionality. The portable device 12 further includes a camera 300 which captures an image stream of the display 14 when the portable device 12 is held proximate to the display 14 with its camera 300 facing the display 14. The portable device also includes a communications module 302 for facilitating wireless communication with network 290.

A position analyzer 304 is included in the portable device 12 for determining the position of the portable device based on analysis of the captured image stream from camera 300. The position analyzer 304 includes an image stream extractor 306 which extracts image frames from the captured image stream which were taken when a pattern for position determination was displayed on the display 14. And a frame analyzer 308 analyzes the sequence of extracted image frames in order to determine the location and rotation of the portable device 12 relative to the display 14.

Based on the determined location and rotation of the portable device 12, a supplemental content presenter 310 retrieves and presents supplemental content 292 via network 290 for display on the display 298 of the portable device 12. In this manner, the primary content shown on the display 14 is supplemented with related supplemental content 292 in real-time based on the current location and rotation of the portable device 12 relative to the display 14.

FIG. 14 illustrates a system for presenting related content on a portable device 12 based on its location and rotation relative to a display, in accordance with an embodiment of the invention. A content creator 312 generates primary content 314 and related content 320 that is to be presented on the portable device 12 based on its location and rotation relative to the display 14. The content 314 is combined with a position signal to generate a combined content stream 316. The position signal can include sequences of patterns or employ digital watermarking technologies to facilitate determination of the position of the portable device in accordance with principles described herein. A signal provider 318 is a cable, satellite, or other network signal provider that distributes or broadcasts content over network 290. In various embodiments, the combined content stream 316 can be generated by the content creator 312 or the signal provider 318, or a third party.

The combined content stream 316 is transmitted to and rendered on the display 14. Programming information 322 is provided to enable the portable device 12 to determine what primary content is being rendered on the display 14 as well as details regarding the nature of the primary content, such as its duration, the time location of commercials, etc.

As the portable device 12 is held proximate to or against the display 14, it determines its location and rotation relative to the display 14 based on analysis of a captured image stream taken by the portable device 12, in accordance with principles described herein. The portable device 12 retrieves related content 320 via network 290 based on its determine location and rotation. In this manner, the portable device 12 provides access to additional content and features that supplement those of the primary content shown on the display 14 based on its position relative to the display 14.

Figure 15A:
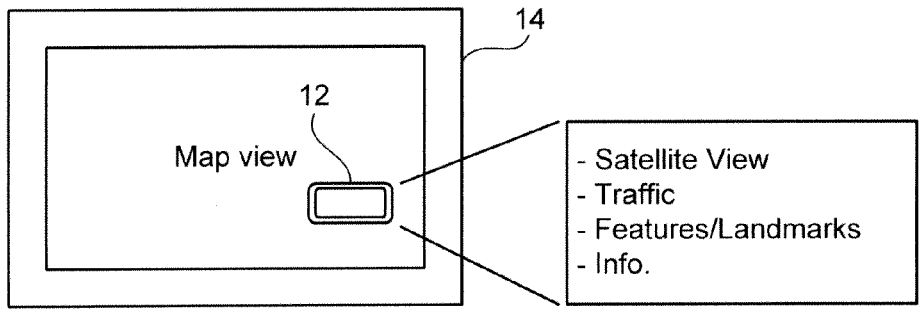
FIGS. 15A, 15B, and 15C illustrate various types of functionality provided based on tracked location and rotation of a portable device relative to a display, in accordance with embodiments of the invention.
Figure 15B:
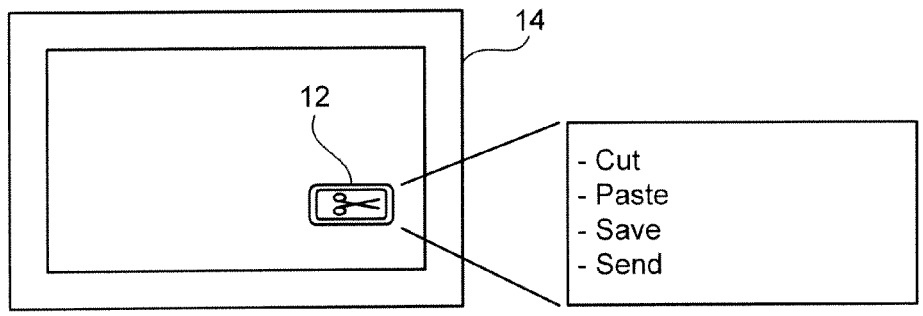
Figure 15C:
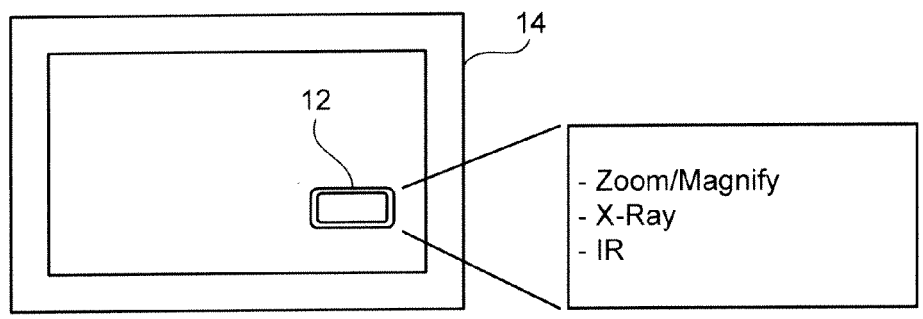

FIGS. 15A, 15B, and 15C illustrate various types of functionality provided based on tracked location and rotation of a portable device relative to a display, in accordance with embodiments of the invention. For example, with reference to FIG. 15A, a view of a map shown on the display 14. As the portable device 12 is held proximate to or against the display 14, its location and rotation relative to the display 14 are determined and tracked. In various embodiments, various types of features relating to the map shown on the display 14 can be provided at the portable device 12. For example, the portable device 12 can display alternate views of the map, such as a satellite view when the map shown on the display 14 is rendering a regular map view. The portable device 12 could also display additional information not shown on the display 14, such as traffic information, features and landmarks, locations of certain types of businesses, etc.

At FIG. 15B, the portable device 12 is utilized to perform additional functions related to the content shown on the display 14. For example, in one embodiment the portable device 12 provides cut and paste functionality, enabling the user to cut and paste a portion of the image shown on the display 14. The specific portion of the image can be determined based on the position of the portable device 12 relative to the display 14. For example, in one embodiment, the portable device 12 clips a portion of the image shown on the display 18 corresponding to that portion of which is covered by the portable device 12. In another embodiment, a portion of the image shown on the display 14 occupying a region surrounding the portable device 12 is clipped. In still another embodiment, a user moves the portable device 12 about the display 14 to delineate the boundaries of the portion of the displayed image to be cut. As shown, once an image has been clipped, it can be saved to the portable device 12 or sent to another device or user, such as via a text message or e-mail.

FIG. 15C illustrates the portable device 12 providing additional features related to the content image shown on the display 14. For example, in one embodiment the portable device 12 provides a zoomed or magnified view of the content image shown on the display 14 wherein the portable device 12 is located. In other embodiments, the portable device 12 provides alternative viewing modes such as an x-ray viewing mode or infrared viewing mode. Such viewing modes can be created in the context of the video game to enable a user to experience alternative views of a virtual environment.

Figure 16:
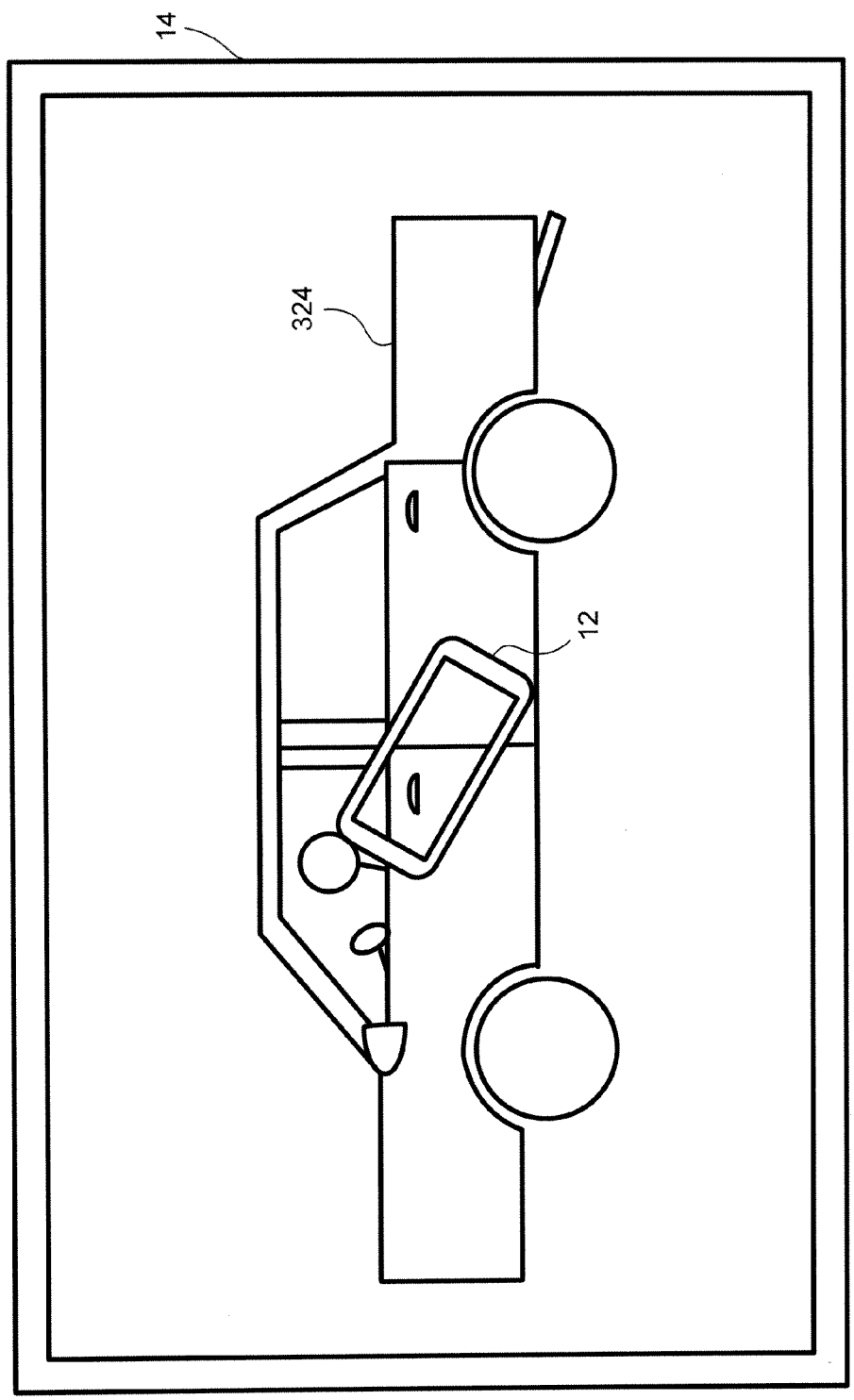
FIG. 16 illustrates a portable device held proximate to a display 14, in accordance with an embodiment of the invention.

FIG. 16 illustrates a portable device held proximate to a display 14, in accordance with an embodiment of the invention. As shown, a vehicle 324 is shown on the display 14. The location and rotation of the portable device 12 relative to the display 14 are determined and tracked. As shown, the portable device 12 displays that portion of the vehicle 324 which would otherwise be covered by the portable device 12. In various embodiments, the portable device can provide additional features relating to the specific portion of the vehicle 324. Though described with reference to vehicle 324 shown on display 14, it will be appreciated that portable device 12 can be configured display the portion of any object or image shown on the display 14 that would otherwise be covered by the portable device, and to provide additional features relating to the portion.

The foregoing examples of various types of features provided based on the location and rotation of a portable device relative to display are provided by way of example only, and not by way of limitation. In other embodiments, the location and rotation of the portable device relative to the display can be used to provide any type of feature or functionality that is dependent upon knowledge of the portable device's location and rotation.

Figure 17:
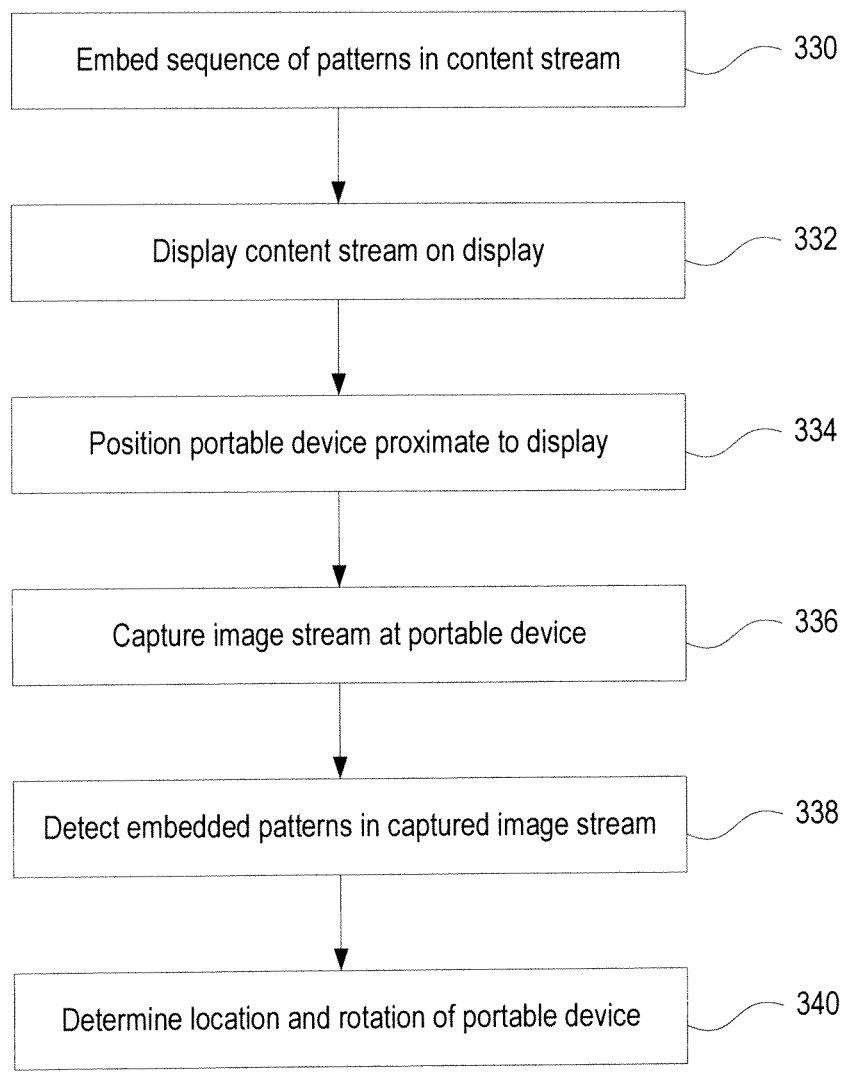
FIG. 17 illustrates a method for determining the location of a portable device relative to a display, in accordance with an embodiment of the invention.

FIG. 17 illustrates a method for determining the location of a portable device relative to a display, in accordance with an embodiment of the invention. At method operation 330, content for location determination is embedded in a content stream. At method operation 332, the content stream containing the embedded content is displayed on the display. At method operation 334, the portable device is positioned proximate to or against the display, such that an image capture device of the portable device is directed towards the display. At method operation 336, the image capture device of the portable device captures an image stream from a region of the display as it is rendering the content stream. At method operation 338, the embedded content for location determination is detected in the captured image stream. And at method operation 340, the location of the portable device relative to the display is determined based on the detected content for location determination.

Figure 18:
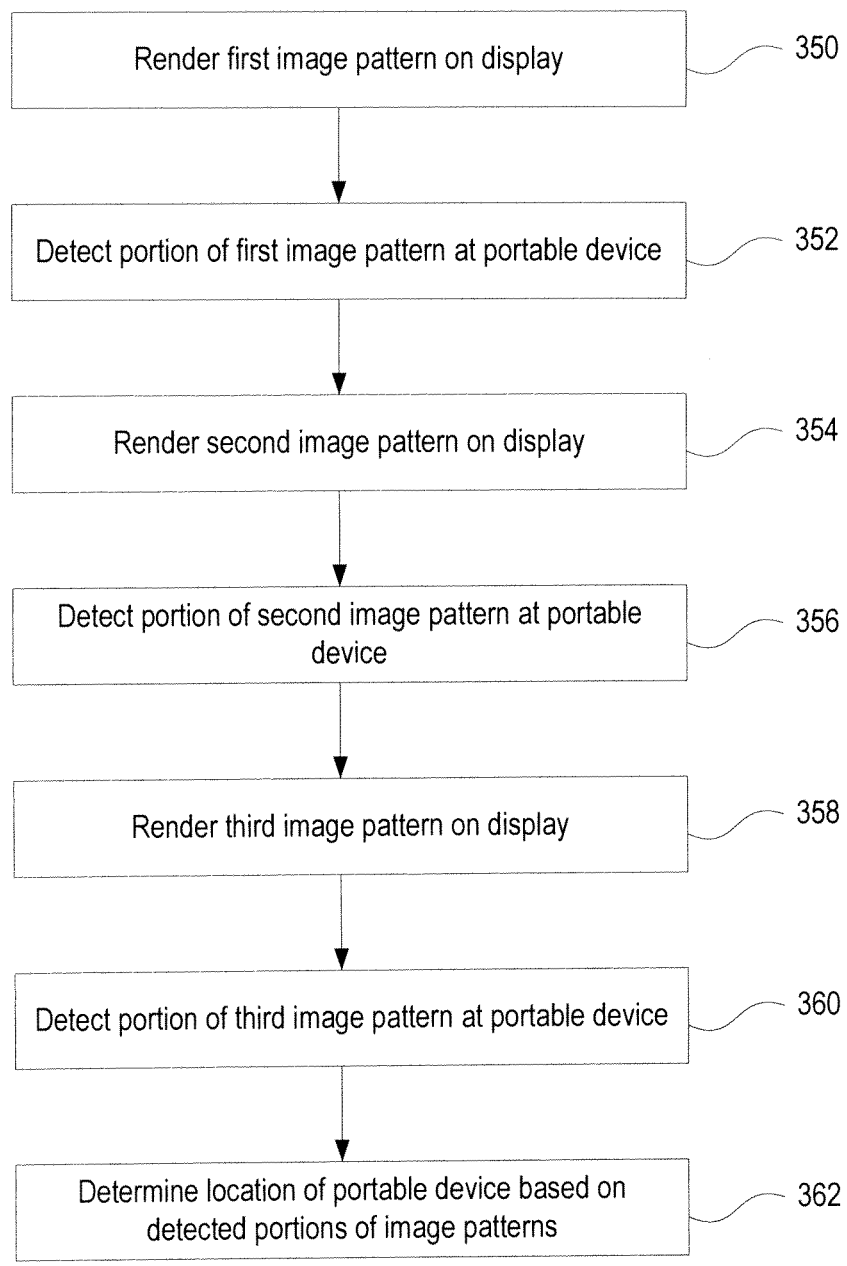
FIG. 18 illustrates a method for determining that location of a portable device relative to a display, in accordance with an embodiment of the invention.

FIG. 18 illustrates a method for determining that location of a portable device relative to a display, in accordance with an embodiment of the invention. At method operation 350, a first image pattern is rendered on the display. At method operation 352, a portion of the first image pattern is detected at the portable device. At method operation 354, a second image pattern is rendered on the display. At method operation 356, a portion of the second image pattern is detected at the portable device. At method operation 358, a third image pattern is rendered on the display. At method operation 360, a portion of the third image pattern is detected at the portable device. At method operation 362, the location of the portable device is determined based on the detected portions of the first, second, and third image patterns.

Figure 19:
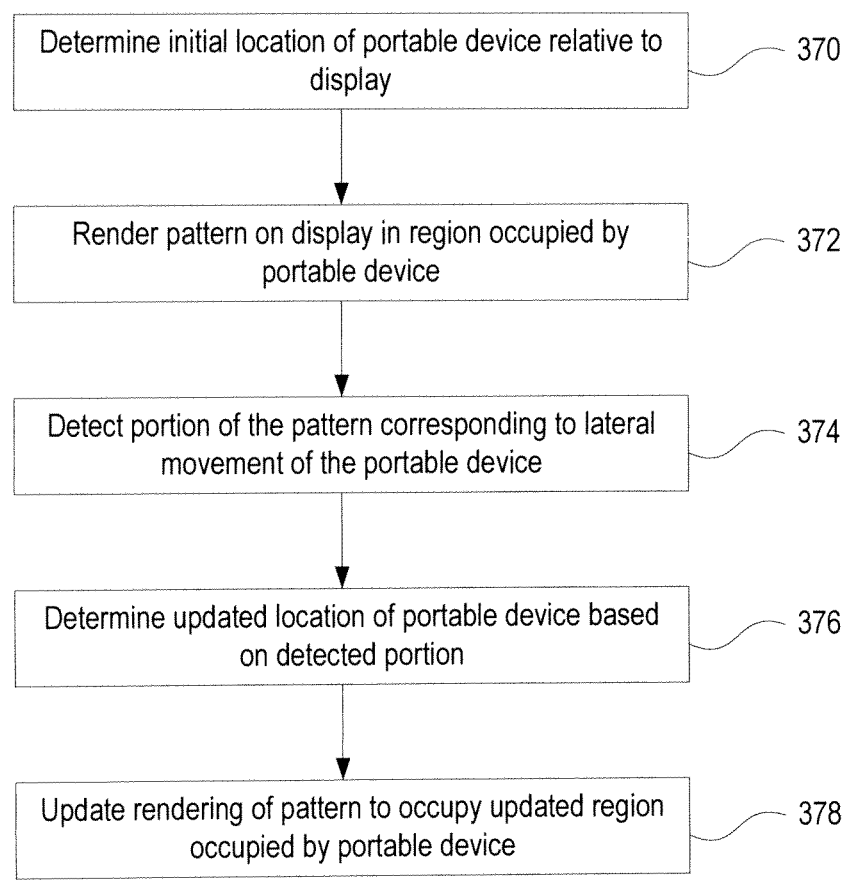
FIG. 19 illustrates a method for tracking the location of a portable device relative to a display, in accordance with an embodiment of the invention.

FIG. 19 illustrates a method for tracking the location of a portable device relative to a display, in accordance with an embodiment of the invention. At method operation 370, the initial location of the portable device relative to the display is determined when the portable device is positioned proximate to or against the display. At method operation 372, a pattern is rendered on the display in a region of the display occupied by the portable device. At method operation 374, a portion of the pattern corresponding to a lateral movement of the portable device in a plane substantially parallel to a plane defined by a display surface of the display is detected. At method operation 376, an updated location of the portable device is determined based on the detected portion of the pattern. At operation 378, the rendering of the pattern is updated based on the determined updated location of the portable device so that the pattern is rendered in a n updated region of the display occupied by the portable device.

Figure 20:
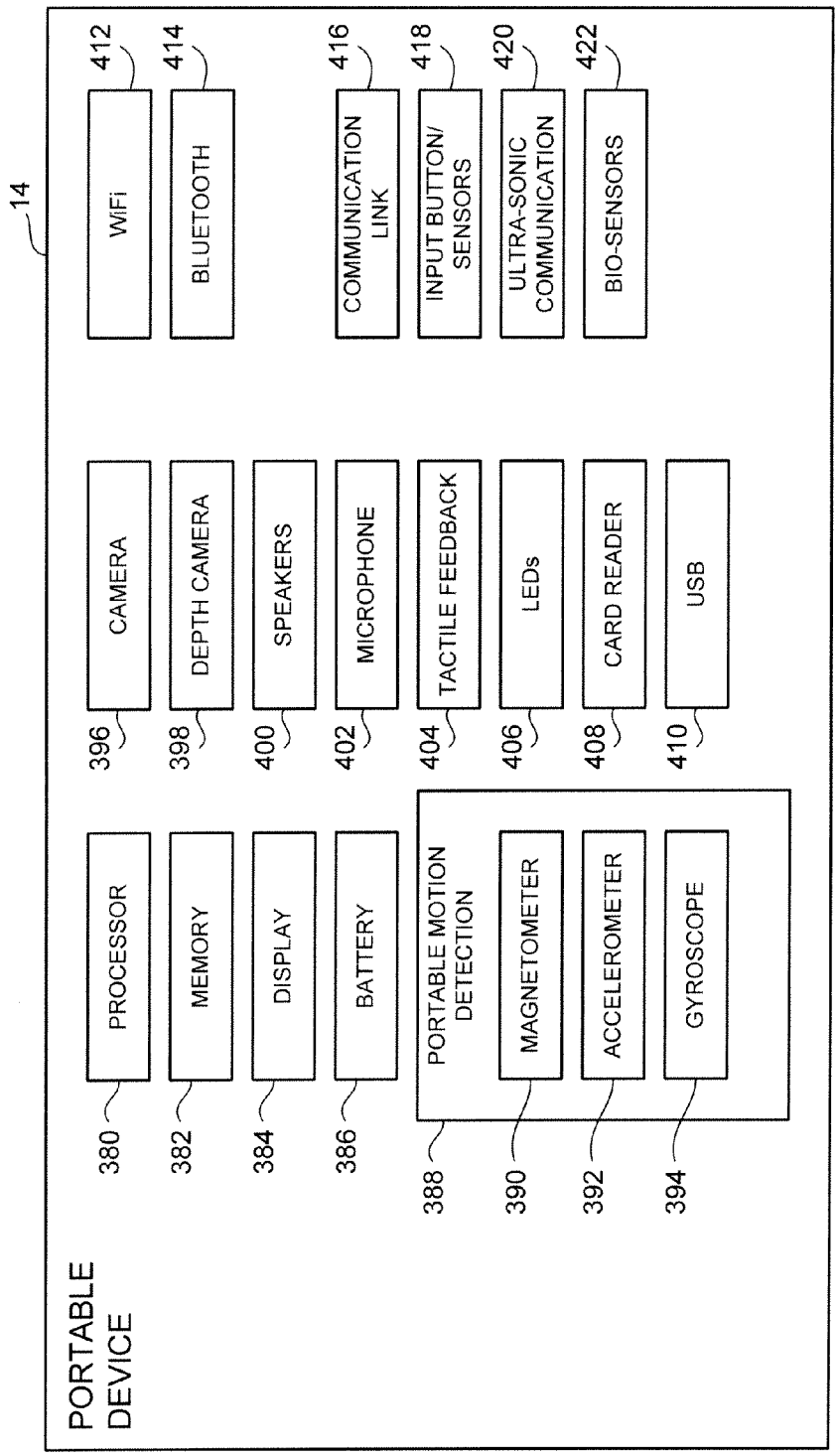
FIG. 20 illustrates a diagram showing components of a portable device, in accordance with an embodiment of the invention.

With reference to FIG. 20, a diagram illustrating components of a portable device 10 is shown, in accordance with an embodiment of the invention. The portable device 10 includes a processor 160 for executing program instructions. A memory 162 is provided for storage purposes, and may include both volatile and non-volatile memory. A display 164 is included which provides a visual interface that a user may view. A battery 166 is provided as a power source for the portable device 10. A motion detection module 168 may include any of various kinds of motion sensitive hardware, such as a magnetometer 170, an accelerometer 172, and a gyroscope 174.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 172 are used to provide the direction of gravity, which gives an absolute reference for two angles (world-space pitch and world-space roll).

A magnetometer measures the strength and direction of the magnetic field in the vicinity of the controller. In one embodiment, three magnetometers 170 are used within the controller, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 172 is used together with magnetometer 170 to obtain the inclination and azimuth of the portable device 28.

A gyroscope is a device for measuring or maintaining orientation, based on the principles of angular momentum. In one embodiment, three gyroscopes 174 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 176 is provided for capturing images and image streams of a real environment. More than one camera may be included in the portable device 28, including a camera that is rear-facing (directed away from a user when the user is viewing the display of the portable device), and a camera that is front-facing (directed towards the user when the user is viewing the display of the portable device). Additionally, a depth camera 178 may be included in the portable device for sensing depth information of objects in a real environment.

The portable device 10 includes speakers 180 for providing audio output. Also, a microphone 182 may be included for capturing audio from the real environment, including sounds from the ambient environment, speech made by the user, etc. The portable device 28 includes tactile feedback module 184 for providing tactile feedback to the user. In one embodiment, the tactile feedback module 184 is capable of causing movement and/or vibration of the portable device 28 so as to provide tactile feedback to the user.

LEDs 186 are provided as visual indicators of statuses of the portable device 28. For example, an LED may indicate battery level, power on, etc. A card reader 188 is provided to enable the portable device 28 to read and write information to and from a memory card. A USB interface 190 is included as one example of an interface for enabling connection of peripheral devices, or connection to other devices, such as other portable devices, computers, etc. In various embodiments of the portable device 28, any of various kinds of interfaces may be included to enable greater connectivity of the portable device 28.

A WiFi module 192 is included for enabling connection to the Internet via wireless networking technologies. Also, the portable device 28 includes a Bluetooth module 194 for enabling wireless connection to other devices. A communications link 196 may also be included for connection to other devices. In one embodiment, the communications link 196 utilizes infrared transmission for wireless communication. In other embodiments, the communications link 196 may utilize any of various wireless or wired transmission protocols for communication with other devices.

Input buttons/sensors 198 are included to provide an input interface for the user. Any of various kinds of input interfaces may be included, such as buttons, touchpad, joystick, trackball, etc. An ultra-sonic communication module 200 may be included in portable device 28 for facilitating communication with other devices via ultra-sonic technologies.

Bio-sensors 202 are included to enable detection of physiological data from a user. In one embodiment, the bio-sensors 202 include one or more dry electrodes for detecting bio-electric signals of the user through the user's skin.

The foregoing components of portable device 28 have been described as merely exemplary components that may be included in portable device 28. In various embodiments of the invention, the portable device 28 may or may not include some of the various aforementioned components. Embodiments of the portable device 28 may additionally include other components not presently described, but known in the art, for purposes of facilitating aspects of the present invention as herein described.

It will be appreciated by those skilled in the art that in various embodiments of the invention, the aforementioned handheld device may be utilized in conjunction with an interactive application displayed on a display to provide various interactive functions. The exemplary embodiments described herein are provided by way of example only, and not by way of limitation.

Figure 21:
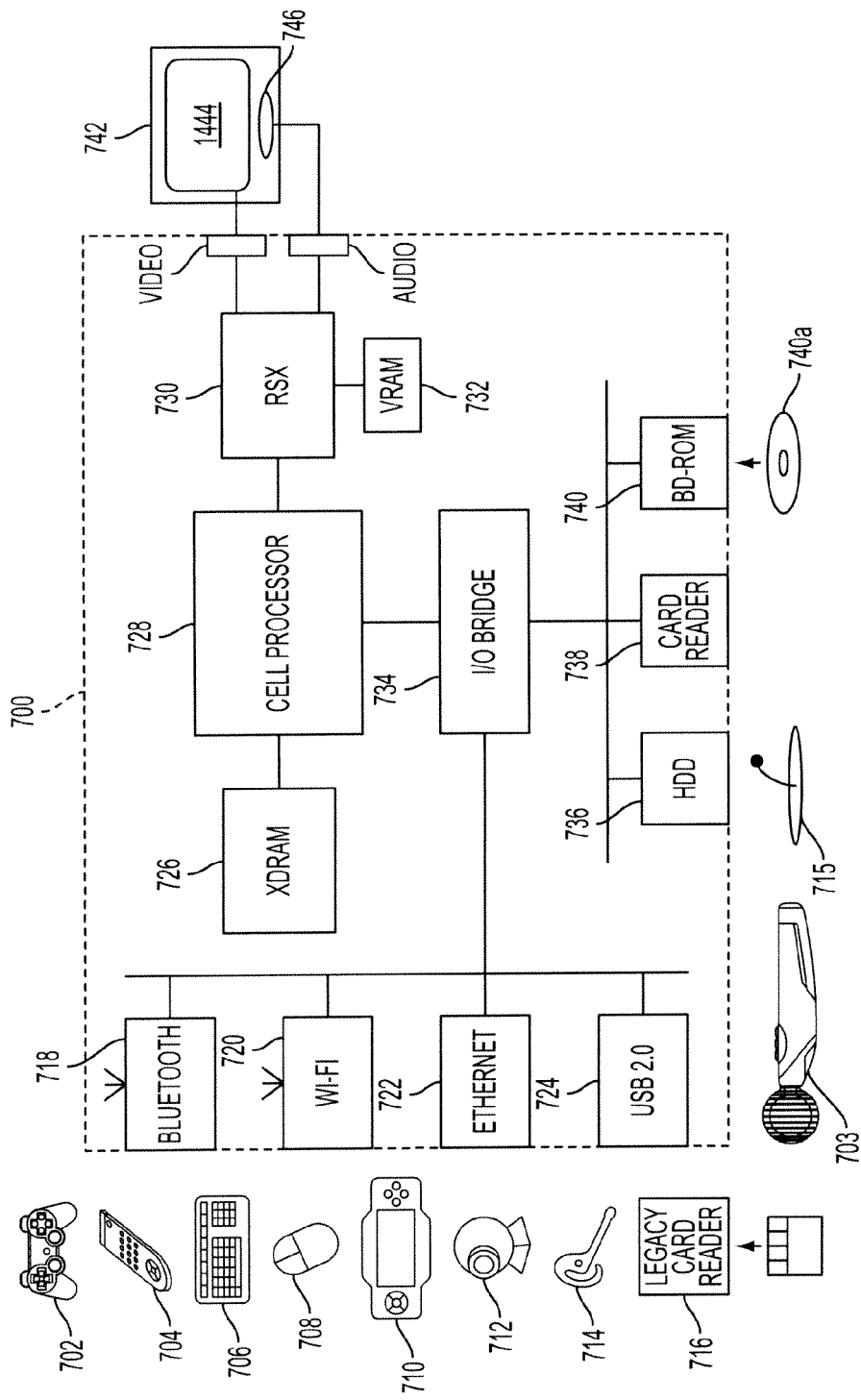
FIG. 21 schematically illustrates the overall system architecture of the Sony® Playstation 3® entertainment device, a console that may be compatible for interfacing a control device and a handheld device with a computer program executing at a base computing device in accordance with embodiments of the present invention.

FIG. 21 illustrates hardware and user interfaces that may be used to execute and render an interactive application, in accordance with one embodiment of the present invention. FIG. 21 schematically illustrates the overall system architecture of the Sony® Playstation 3® entertainment device, a console that may be compatible for interfacing a control device and a handheld device with a computer program executing at a base computing device in accordance with embodiments of the present invention. A system unit 700 is provided, with various peripheral devices connectable to the system unit 700. The system unit 700 comprises: a Cell processor 728; a Rambus® dynamic random access memory (XDRAM) unit 726; a Reality Synthesizer graphics unit 730 with a dedicated video random access memory (VRAM) unit 732; and an I/O bridge 734. The system unit 700 also comprises a Blu Ray® Disk BD-ROM® optical disk reader 740 for reading from a disk 740a and a removable slot-in hard disk drive (HDD) 736, accessible through the I/O bridge 734. Optionally the system unit 700 also comprises a memory card reader 738 for reading compact flash memory cards, Memory Stick® memory cards and the like, which is similarly accessible through the I/O bridge 734.

The I/O bridge 734 also connects to six Universal Serial Bus (USB) 2.0 ports 724; a gigabit Ethernet port 722; an IEEE 802.11b/g wireless network (Wi-Fi) port 720; and a Bluetooth® wireless link port 718 capable of supporting up to seven Bluetooth connections.

In operation, the I/O bridge 734 handles all wireless, USB and Ethernet data, including data from one or more game controllers 702-703. For example when a user is playing a game, the I/O bridge 734 receives data from the game controller 702-703 via a Bluetooth link and directs it to the Cell processor 728, which updates the current state of the game accordingly.

The wireless, USB and Ethernet ports also provide connectivity for other peripheral devices in addition to game controllers 702-703, such as: a remote control 704; a keyboard 706; a mouse 708; a portable entertainment device 710 such as a Sony Playstation Portable® entertainment device; a video camera such as an EyeToy® video camera 712; a microphone headset 714; and a microphone 715. Such peripheral devices may therefore in principle be connected to the system unit 700 wirelessly; for example the portable entertainment device 710 may communicate via a Wi-Fi ad-hoc connection, whilst the microphone headset 714 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 716 may be connected to the system unit via a USB port 724, enabling the reading of memory cards 748 of the kind used by the Playstation® or Playstation 2® devices.

The game controllers 702-703 are operable to communicate wirelessly with the system unit 700 via the Bluetooth link, or to be connected to a USB port, thereby also providing power by which to charge the battery of the game controllers 702-703. Game controllers 702-703 can also include memory, a processor, a memory card reader, permanent memory such as flash memory, light emitters such as an illuminated spherical section, LEDs, or infrared lights, microphone and speaker for ultrasound communications, an acoustic chamber, a digital camera, an internal clock, a recognizable shape such as the spherical section facing the game console, and wireless communications using protocols such as Bluetooth®, WiFi™, etc.

Game controller 702 is a controller designed to be used with two hands, and game controller 703 is a single-hand controller with an attachment. In addition to one or more analog joysticks and conventional control buttons, the game controller is susceptible to three-dimensional location determination. Consequently gestures and movements by the user of the game controller may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 704 is also operable to communicate wirelessly with the system unit 700 via a Bluetooth link. The remote control 704 comprises controls suitable for the operation of the Blu Ray™ Disk BD-ROM reader 540 and for the navigation of disk content.

The Blu Ray™ Disk BD-ROM reader 740 is operable to read CD-ROMs compatible with the Playstation and PlayStation 2 devices, in addition to conventional pre-recorded and recordable CDs, and so-called Super Audio CDs. The reader 740 is also operable to read DVD-ROMs compatible with the Playstation 2 and PlayStation 3 devices, in addition to conventional pre-recorded and recordable DVDs. The reader 740 is further operable to read BD-ROMs compatible with the Playstation 3 device, as well as conventional pre-recorded and recordable Blu-Ray Disks.

The system unit 700 is operable to supply audio and video, either generated or decoded by the Playstation 3 device via the Reality Synthesizer graphics unit 730, through audio and video connectors to a display and sound output device 742 such as a monitor or television set having a display 744 and one or more loudspeakers 746. The audio connectors 750 may include conventional analogue and digital outputs whilst the video connectors 752 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 728. The Playstation 3 device's operating system supports Dolby® 5.1 surround sound, Dolby® Theatre Surround (DTS), and the decoding of 7.1 surround sound from Blu-Ray® disks.

In the present embodiment, the video camera 712 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 700. The camera LED indicator is arranged to illuminate in response to appropriate control data from the system unit 700, for example to signify adverse lighting conditions. Embodiments of the video camera 712 may variously connect to the system unit 700 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs. In another embodiment the camera is an infrared camera suitable for detecting infrared light.

In general, in order for successful data communication to occur with a peripheral device such as a video camera or remote control via one of the communication ports of the system unit 700, an appropriate piece of software such as a device driver should be provided. Device driver technology is well-known and will not be described in detail here, except to say that the skilled man will be aware that a device driver or similar software interface may be required in the present embodiment described.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

One or more embodiments of the present invention can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for determining the location of a portable device relative to a display, comprising:
   capturing an image stream by the portable device when the portable device is positioned adjacent to the display, the image stream captured from a region of the display when the display is actively rendering a content stream that is defined by a plurality of image frames, the content stream including embedded content for position determination, wherein the embedded content defines a sequence of patterns, wherein each pattern defines a plurality of regions of the display, and wherein subsequent patterns in the sequence of patterns occupy an increasingly smaller portion of the display, wherein a subsequent pattern to a preceding pattern in the sequence of patterns does not obstruct a portion of the content stream in an image frame;

detecting the embedded content within the captured image stream, wherein detecting the embedded content includes detecting a portion of each pattern in the sequence of patterns;

determining the location of the portable device relative to the display based on the detected embedded content, wherein determining the location of the portable device includes, for each pattern, localizing the portable device to at least one of the regions of the display defined by the pattern, and identifying an overlapping portion of the regions to which the portable device has been localized.

2. The method of claim 1,
wherein the embedded content is defined by image data embedded in at least a portion of the plurality of image frames.

3. The method of claim 2,
wherein the embedded image data defines the sequence of patterns;
wherein detecting the embedded content includes detecting a portion of each pattern in the sequence of patterns; and
wherein localizing the portable device includes analyzing the detected portions of the sequence of patterns.

4. The method of claim 2,
wherein the embedded image data defines a series of digital watermark arrays, each digital watermark array defining a digital watermark for each of a plurality of regions of the display.

5. The method of claim 1, wherein subsequent patterns in the sequence of patterns occupying an increasingly smaller portion of the display is defined by, localizing the portable device to one of a plurality of regions of the display defined by a first pattern, and configuring a second pattern, that is successive to the first pattern, to occupy the one of the plurality of regions of the display to which the portable device has been localized.

6. The method of claim 5, wherein the second pattern is included as part of an image frame of the content stream.

7. The method of claim 1, wherein the subsequent patterns in the sequence of patterns are successively reduced in size in a direction that is towards the location of the portable device.

8. A system, comprising:
a console device computer having a memory and a processor, the computer configured to generate a content stream, that is defined by a plurality of image frames, including embedded content for position determination, wherein the embedded content defines a sequence of patterns, wherein each pattern defines a plurality of regions of a display, wherein the plurality of regions defined by a given pattern are different from the plurality of regions defined by other patterns in the sequence of patterns, and wherein subsequent patterns in the sequence of patterns occupy an increasingly smaller portion of the display, wherein a subsequent pattern to a preceding pattern in the sequence of patterns does not obstruct a portion of the content stream in an image frame;

a portable device having an image capture device for capturing an image stream when the portable device is positioned adjacent to the display, the image stream captured from a region of the display when the display is actively rendering the content stream, the portable device configured to detect the embedded content within the captured image stream and determine its location relative to the display based on the detected embedded content, wherein detecting the embedded content includes detecting a portion of each pattern in the sequence of patterns, wherein determining the location of the portable device includes, for each pattern, localizing the portable device to one of the regions defined by the pattern;

wherein subsequent patterns in the sequence of patterns occupying an increasingly smaller portion of the display is defined by, localizing the portable device to one of a plurality of regions of the display defined by a first pattern, and configuring a second pattern, that is successive to the first pattern, to occupy the one of the plurality of regions of the display to which the portable device has been localized, wherein the second pattern is included as part of an image frame of the content stream.

9. The system of claim 8,
wherein the embedded content is defined by image data embedded in at least a portion of the plurality of image frames.

10. The system of claim 9,
wherein the embedded image data defines the sequence of patterns;
wherein the portable device is configured to detect the embedded content by detecting a portion of each pattern in the sequence of patterns; and
wherein localizing the portable device includes analyzing the detected portions of the sequence of patterns.

11. The system of claim 9,
wherein the embedded image data defines a series of digital watermark arrays, each digital watermark array defining a digital watermark for each of a plurality of regions of the display.

12. The system of claim 8, wherein determining the location of the portable device includes identifying an overlapping portion of the regions to which the portable device has been localized.

13. The system of claim 8, wherein the subsequent patterns in the sequence of patterns are successively reduced in size in a direction that is towards the location of the portable device.

14. A computer program product embodied on a non-transitory computer readable medium, comprising program instructions for determining the location of a portable device relative to a display, including:
program instructions for capturing an image stream by the portable device when the portable device is positioned adjacent to the display, the image stream captured from a region of the display when the display is actively rendering a content stream that is defined by a plurality of image frames, the content stream including embedded content for position determination, wherein the embedded content defines a sequence of patterns, wherein each pattern defines a plurality of regions of the display, the regions defined by each successive pattern in the sequence of patterns being smaller that than the regions defined by a preceding pattern in the sequence of patterns, and wherein subsequent patterns in the sequence of patterns occupy an increasingly smaller portion of the display, wherein a subsequent pattern to a preceding pattern in the sequence of patterns does not obstruct a portion of the content stream in an image frame;

program instructions for detecting the embedded content within the captured image stream, wherein detecting the embedded content includes detecting a portion of each pattern in the sequence of patterns;

program instructions for determining the location of the portable device relative to the display based on the detected embedded content, wherein determining the location of the portable device includes, for each pattern, localizing the portable device to one of the regions defined by the pattern;

wherein subsequent patterns in the sequence of patterns occupying an increasingly smaller portion of the display is defined by, localizing the portable device to one of a plurality of regions of the display defined by a first pattern, and configuring a second pattern, that is successive to the first pattern, to occupy the one of the plurality of regions of the display to which the portable device has been localized, wherein the second pattern is included as part of an image frame of the content stream.

15. The computer program product of claim 14,
wherein the embedded content is defined by image data embedded in at least a portion of the plurality of image frames.

16. The computer program product of claim 15,
wherein the embedded image data defines the sequence of patterns;
wherein detecting the embedded content includes detecting a portion of each pattern in the sequence of patterns; and
wherein localizing the portable device includes analyzing the detected portions of the sequence of patterns.

17. The computer program product of claim 15,
wherein the embedded image data defines a series of digital watermark arrays, each digital watermark array defining a digital watermark for each of a plurality of regions of the display.

18. The computer program product of claim 14, wherein determining the location of the portable device includes identifying an overlapping portion of the regions to which the portable device has been localized.

19. The computer program product of claim 14, wherein the subsequent patterns in the sequence of patterns are successively reduced in size in a direction that is towards the location of the portable device.

* * * * *